United States Patent
Hahm et al.

(10) Patent No.: US 11,390,975 B2
(45) Date of Patent: Jul. 19, 2022

(54) CONDENSING DUCT, AND WASHING AND DRYING MACHINE INCLUDING THE SAME

(71) Applicant: Samsung Electronics Co., Ltd., Suwon-si (KR)

(72) Inventors: Jungyoon Hahm, Suwon-si (KR); Donggeun Park, Suwon-si (KR); Dong-Pil Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 276 days.

(21) Appl. No.: 16/852,782

(22) Filed: Apr. 20, 2020

(65) Prior Publication Data
US 2020/0332448 A1    Oct. 22, 2020

(30) Foreign Application Priority Data
Apr. 19, 2019 (KR) .................. 10-2019-0046352

(51) Int. Cl.
*D06F 25/00* (2006.01)
*D06F 58/24* (2006.01)
(Continued)

(52) U.S. Cl.
CPC ............. *D06F 25/00* (2013.01); *B01D 46/79* (2022.01); *D06F 58/22* (2013.01); *D06F 58/24* (2013.01); *B01D 2279/35* (2013.01)

(58) Field of Classification Search
CPC .......... D06F 58/22; D06F 58/24; D06F 25/00; B01D 46/79; B01D 2279/35
(Continued)

(56) References Cited

U.S. PATENT DOCUMENTS 3,672,188 A * 6/1972 Geschka ................. D06F 17/04
68/12.22
4,011,663 A * 3/1977 Moyer .................... F26B 21/02
34/212
(Continued)

FOREIGN PATENT DOCUMENTS

EP    2698468 A1 *  2/2014  ............. D06F 25/00
EP    3696308 A1 *  8/2020  ............. D06F 21/08
(Continued)

OTHER PUBLICATIONS

International Search Report dated Aug. 19, 2020 in International Patent Application No. PCT/KR2020/005205.

*Primary Examiner* — Stephen M Gravini
(74) *Attorney, Agent, or Firm* — Staas & Halsey LLP

(57) ABSTRACT

A washing and drying machine includes a cabinet, a tub disposed inside the cabinet, a condensation duct connected to the tub to condense moisture in air introduced from the inside of the tub, and a drying duct connected to the condensation duct to heat the air introduced into the condensation duct and supply the heated air back into the tub, wherein the condensation duct includes a housing, an inlet disposed at a lower portion of the housing and connected to the tub, an outlet disposed at an upper portion of the housing and connected to the drying duct, a supply nozzle configured to supply condensation water inside the housing, and a rib disposed adjacent to the inlet, wherein the rib includes a gathering portion configured to collect at least a part of the condensation water, and wherein the condensation water collected in the gathering portion falls to the inlet side.

20 Claims, 22 Drawing Sheets

(51) Int. Cl.
  *D06F 58/22* (2006.01)
  *B01D 46/79* (2022.01)
(58) Field of Classification Search
  USPC .................................................. 34/595–610
  See application file for complete search history.

(56) References Cited

U.S. PATENT DOCUMENTS

| | | | | |
|---|---|---|---|---|
| 6,293,121 | B1 * | 9/2001 | Labrador | F03D 5/00 |
| | | | | 62/304 |
| 7,302,815 | B2 * | 12/2007 | Kim | D06F 58/24 |
| | | | | 68/18 C |
| 9,695,541 | B2 * | 7/2017 | Kim | D06F 25/00 |
| 10,094,616 | B2 * | 10/2018 | Carin | F26B 23/001 |
| 10,619,921 | B2 * | 4/2020 | Brodie | F26B 25/12 |
| 10,816,266 | B2 * | 10/2020 | Welch | F26B 25/16 |
| 11,148,159 | B2 * | 10/2021 | Leibman | B05B 15/70 |
| 11,225,747 | B2 * | 1/2022 | Khizar | D06F 39/14 |
| 11,242,646 | B2 * | 2/2022 | Welch | F26B 11/049 |
| 2014/0150286 | A1 | 6/2014 | Jadhav et al. | |
| 2018/0355548 | A1 | 12/2018 | Oak et al. | |
| 2019/0024279 | A1 * | 1/2019 | Lee | D06F 23/02 |
| 2020/0332448 | A1 * | 10/2020 | Hahm | B01D 46/79 |

FOREIGN PATENT DOCUMENTS

| | | | |
|---|---|---|---|
| JP | 2010-167178 | 8/2010 | |
| JP | 2019-500193 | 1/2019 | |
| KR | 10-0456953 | 11/2004 | |
| KR | 10-0597740 | 7/2006 | |
| KR | 10-1141641 | 5/2012 | |
| KR | 10-2016-0149608 | 12/2016 | |
| KR | 10-2019-0010178 | 1/2019 | |
| WO | WO-2020214004 A1 * | 10/2020 | ......... B01D 46/0082 |

* cited by examiner

CONDENSING DUCT, AND WASHING AND DRYING MACHINE INCLUDING THE SAME

CROSS-REFERENCE TO RELATED APPLICATIONS

This application is based on and claims priority under 35 U.S.C. § 119 to Korean Patent Application No. 10-2019-0046352, filed on Apr. 19, 2019, in the Korean Intellectual Property Office, the disclosure of which is incorporated by reference herein in its entirety.

BACKGROUND

1. Field

The disclosure relates to a washing and drying machine, and more particularly, to a dryer of a washing and drying machine.

2. Description of the Related Art

In general, a washing and drying machine refers an apparatus for cleaning laundry by performing washing, rinsing, dehydration and drying on the laundry.

According to a driving type, washing and drying machines are classified into a pulsator type washing and drying machine in which water stream generated when a rotating blade having small wings rotates at a lower portion of a washing tub impacts laundry to wash the laundry, an agitator type in which water stream generated by regular switching of rotation direction of a large stirring blade having wings rotating at a central portion of a washing tub impacts laundry to wash the laundry, and a drum type washing and drying machine in which laundry is washed by a cleaning power of a detergent together with impact on the laundry in a drum due to head drop caused by the rotation of the drum.

A drum type washing and drying machine includes a cabinet, a water tub installed inside the cabinet to receive washing water, a drum rotatably installed in the water tub to accommodate laundry, a driving device for driving the drum, a water supply device for supplying washing water to the water tub, and a drainage device for discharging washing water from the drum to the outside of the cabinet when washing is finished, and also includes a dryer for drying laundry after a washing process.

In general, a dryer of a washing and drying machine performs drying of laundry through a series of processes in which hot air heated by a heater is supplied to the inside of a drum, laundry is heated by hot air, moisture is evaporated from the heated laundry, and evaporated moisture is condensed and discharged.

SUMMARY

It is an aspect of the disclosure to provide a washing and drying machine capable of easily condensing wet air generated in a drum to increase the efficiency of drying energy.

It is another aspect of the disclosure to provide a washing and drying machine capable of effectively condensing wet air generated in a drum in a condensation duct of a certain size to increase condensation efficiency.

Additional aspects of the disclosure will be set forth in part in the description which follows and, in part, will be obvious from the description, or may be learned by practice of the disclosure.

In accordance with an aspect of the disclosure, a washing and drying machine includes a cabinet, a tub disposed inside the cabinet, a condensation duct connected to the tub to condense moisture in air introduced from the inside of the tub, and a drying duct connected to the condensation duct to heat the air introduced into the condensation duct and supply the heated air back into the tub, wherein the condensation duct includes a housing, an inlet disposed at a lower portion of the housing and connected to the tub, an outlet disposed at an upper portion of the housing and connected to the drying duct, a supply nozzle configured to supply condensation water inside the housing, and a rib disposed adjacent to the inlet, wherein the rib includes a gathering portion configured to collect at least a part of the condensation water supplied from the supply nozzle, and wherein the condensation water collected in the gathering portion falls to the inlet side.

The rib may further include a first rib extending in a first direction and a second rib extending in a second direction from a lower end of the first rib, and the gathering portion may be formed between the first rib and the second rib.

The housing may include a first surface on which the inlet is disposed and a second surface facing the first surface, and the supply nozzle may be configured to spray the condensation water toward the first surface.

The rib may be disposed on the first surface and formed to protrude from the first surface toward the second surface.

The housing may further include a collecting portion disposed at a lower portion of the inlet to collect the condensation water falling from the gathering portion.

The gathering portion may be configured such that the condensation water collected in the gathering portion passes through a region corresponding to the inlet in the up-down direction and falls to the collecting portion.

The drying duct may include a fan configured to flow air introduced into the condensation duct into the drying duct, and the condensation duct may be configured such that the condensation water falling from the gathering portion collides with the air passing through the inlet when the air is introduced into the condensation duct from the tub through the inlet by the fan.

The housing may include a first side surface on which the supply nozzle is disposed and a second side surface facing the first side surface, and the outlet may be disposed closer to the second side surface than to the first side surface in the left-right direction.

The washing and drying machine may further include a blocking portion disposed inside the housing to restrict the flow of air inside the housing, wherein the blocking portion may be disposed closer to the outlet than to the supply nozzle in the left-right direction.

The first rib may extend substantially in a vertical direction, and the second rib may extend to be inclined substantially at an angle between 0 degree and 60 degree with respect to the horizontal direction.

The washing and drying machine may further include a filter disposed between the drying duct and the outlet of the condensation duct.

The washing and drying machine may further include a filter cleaning nozzle disposed between the outlet and the filter to spray water into the filter to remove foreign substances collected in the filter.

The outlet may be provided to be opened in the up-down direction, the drying duct may further include a fan rotating about a rotating shaft extending in the up-down direction to introduce air in the condensation duct into the drying duct, and a suction port allowing air sucked by the fan to be sucked into the drying duct, and the rotating shaft of the fan and the center of the outlet may be arranged so as not to overlap in the up-down direction.

The washing and drying machine may further include an additional rib disposed between the supply nozzle and the rib.

The condensation duct may further include an auxiliary collecting portion disposed in the inlet in the up-down direction and configured to temporarily collect the condensation water falling from the gathering portion.

In accordance with another aspect of the disclosure, a washing and drying machine includes a cabinet, a tub disposed inside the cabinet, a condensation duct connected to the tub to condense moisture in air introduced from the inside of the tub, and a drying duct connected to the condensation duct to heat the air introduced into the condensation duct and supply the heated air back into the tub, wherein the condensation duct comprises a housing having a first region and a second region in the up-down direction, an inlet disposed in the second region and connected to the tub, an outlet disposed in the first region and connected to the drying duct, a supply nozzle disposed in the first region to supply condensation water, and a rib disposed in the second region, and wherein the rib comprises a first rib extending in a first direction and a second rib extending in a second direction from a lower end of the first rib.

The washing and drying machine may further include a gathering portion disposed between the first rib and the second rib to collect at least a part of the condensation water supplied from the supply nozzle, wherein the condensation water collected in the gathering portion may fall to the inlet side.

A width of the first region in the left-right direction may be larger than a width of the second region.

The housing may further include a collecting portion disposed at a lower portion of the inlet to collect the condensation water falling from the gathering portion, and a lower end of the collecting portion may be formed parallel to the front-rear direction.

In accordance with another aspect of the disclosure, a washing and drying machine includes a housing extending in the up-down direction, an inlet disposed at a lower portion of the housing to allow air to be introduced into the housing, an outlet disposed at an upper portion of the housing to allow air to flow out of the housing, a supply nozzle configured to supply condensation water inside the housing, and a rib disposed adjacent to the inlet, wherein the rib comprises a first rib extending in a first direction, a second rib extending in a second direction from a lower end of the first rib, and a gathering portion disposed between the first rib and the second rib to collect at least a part of the condensation water supplied from the supply nozzle, and wherein the condensation water collected in the gathering portion falls to the inlet side.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Configurations shown in the embodiments and the drawings described in the present specification are only the preferred embodiments of the present disclosure, and thus it is to be understood that various modified examples, which may replace the embodiments and the drawings described in the present specification, are possible when filing the present application.

Like reference numbers or signs in the various figures of the application represent parts or components that perform substantially the same functions.

The terms used in the present specification are used to describe the embodiments of the present disclosure. Accordingly, it should be apparent to those skilled in the art that the following description of exemplary embodiments of the present invention is provided for illustration purpose only and not for the purpose of limiting the invention as defined by the appended claims and their equivalents. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that although the terms first, second, etc. may be used herein to describe various components, these components should not be limited by these terms, and the terms are only used to distinguish one component from another. For example, without departing from the scope of the disclosure, the first component may be referred to as a second component, and similarly, the second component may also be referred to as a first component. The term "and/or" includes any combination of a plurality of related items or any one of a plurality of related items.

Figure 1:
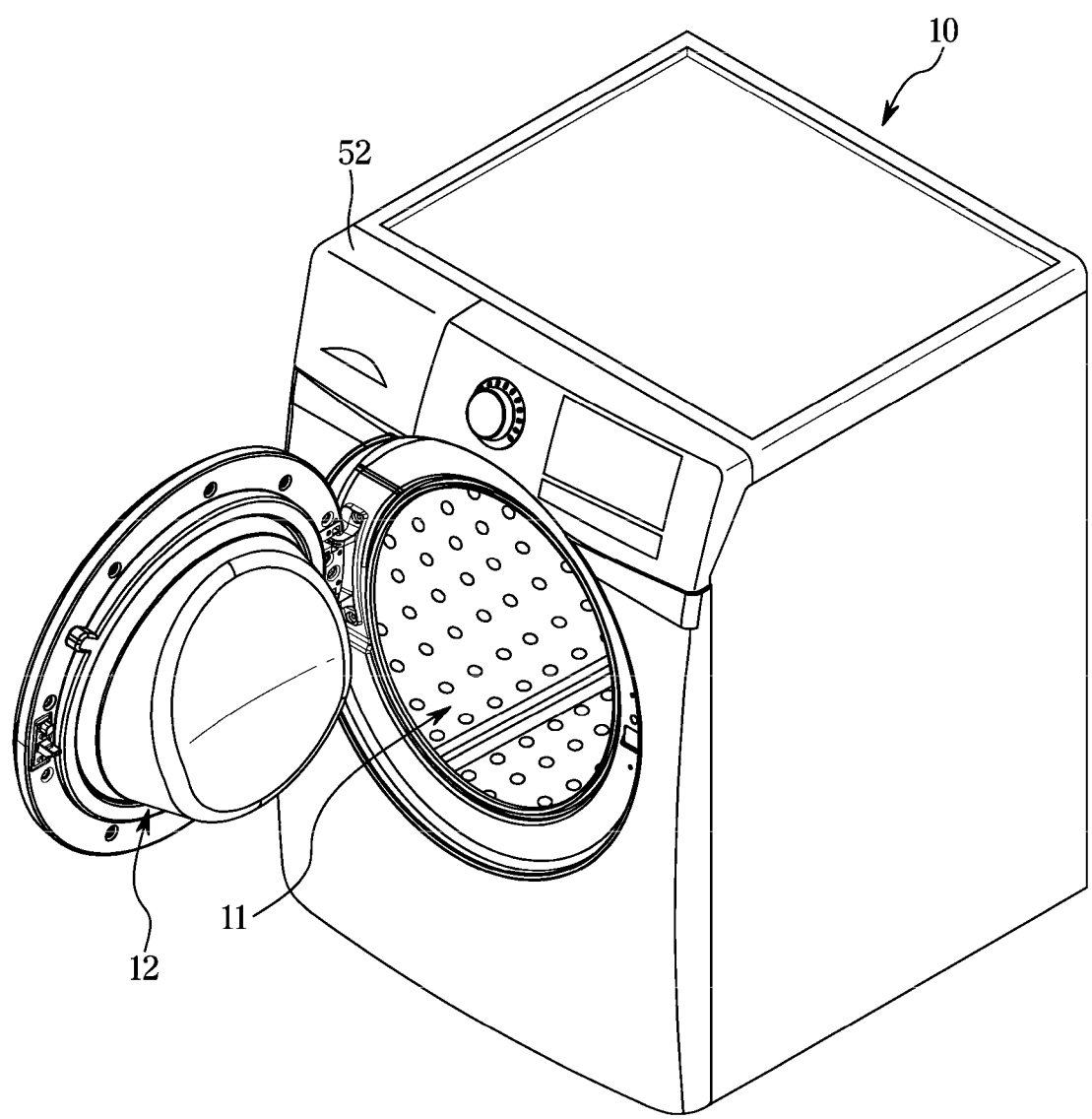
FIG. 1 is a perspective view of a washing and drying machine according to an embodiment of the disclosure.

In relation to "front," "rear," "front side," "rear side," etc. used in the present specification, the side where a door of a washing and drying machine shown in FIG. 1 is positioned will be referred to as "front" and the opposite side will be referred to as "rear."

Based on the direction of the washing and drying machine shown in FIG. 1, the left side of a front side will be referred to as the "left side" and the right side will be referred to as the "right side."

A condensation duct according to the disclosure may be applied to all devices where an object to be dried is dried. However, in an embodiment of the disclosure, the condensation duct will be described as being applied to a washing and drying machine.

Hereinafter, embodiments of the disclosure will be described in detail with reference to the accompanying drawings.

Figure 2:
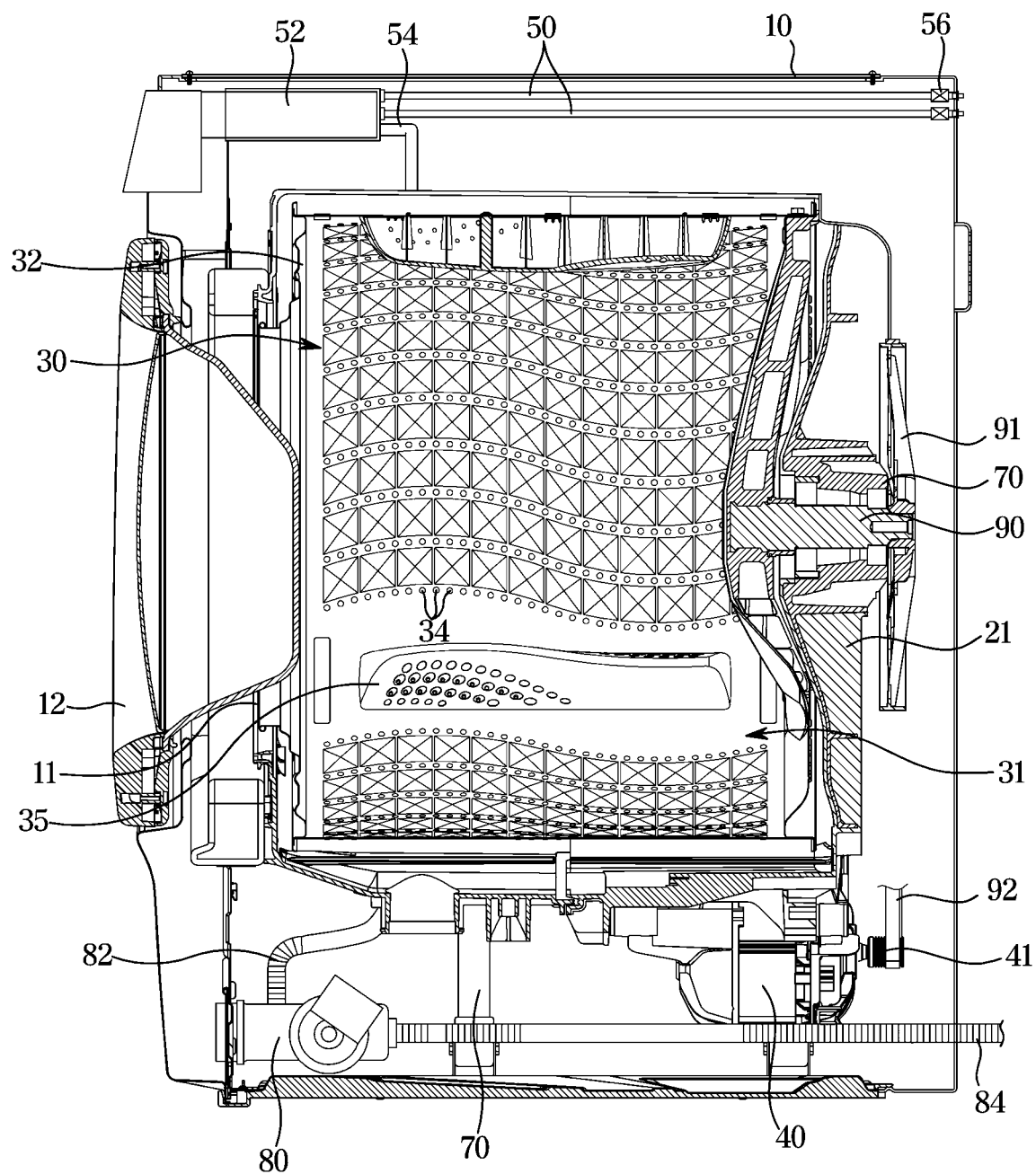
FIG. 2 is a side cross-sectional view of the washing and drying machine according to an embodiment of the disclosure.

FIG. 1 is a perspective view of a washing and drying machine according to an embodiment of the disclosure, and FIG. 2 is a side cross-sectional view of the washing and drying machine according to an embodiment of the disclosure.

As illustrated in FIGS. 1 and 2, a washing and drying machine 1 includes a cabinet 10 forming an outer appearance, a tub 20 disposed inside the cabinet 10, a drum 30 rotatably disposed inside the tub 20, and a driving motor 40 to drive the drum 30.

A front portion of the cabinet 10 is formed with an opening 11 such that laundry may be loaded into the drum 30. The opening 11 is opened and closed by a door 12 installed on the front portion of the cabinet 10.

A water supply pipe 50 for supplying washing water to the tub 20 is installed above the tub 20. One side of the water supply pipe 50 is connected to a water supply valve 56, and the other side of the water supply pipe 50 is connected to a detergent box 52.

The detergent box 52 is connected to the tub 20 through a connection pipe 54. Water supplied through the water supply pipe 50 is supplied to the inside of the tub 20 together with a detergent via the detergent box 52.

The tub 20 is supported by a damper 70. The damper 70 connects an inner bottom surface of the cabinet 10 and an outer surface of the tub 20.

The drum 30 includes a cylindrical portion 31, a front plate 32 disposed in the front of the cylindrical portion 31, and a rear plate 33 disposed in the rear of the cylindrical portion 31. An opening for putting laundry in and out is formed on the front plate 32, and a shaft 90 for transmitting power of the driving motor 40 is connected to the rear plate 33.

A plurality of through holes 34 for the flow of washing water is formed on a circumference of the drum 30, and a plurality of lifters 35 is installed on an inner circumferential surface of the drum 30 such that laundry may rise and fall when the drum 30 rotates.

The drum 30 and the driving motor 40 are connected through the shaft 90, and the connection form of the shaft 90 and the driving motor 40 may be divided into a direct drive type in which the shaft 90 is directly connected to the driving motor 40 to drive the drum 30, and an indirect drive type in which the driving motor 40 and the shaft 90 are connected by a pulley 91 to drive the drum 30.

The washing and drying machine 1 according to an embodiment of the disclosure may be provided as an indirect driving type, but is not limited thereto, and the technical characteristics of the disclosure may be applied to the direct driving type.

One end of the shaft 90 is connected to the rear plate 33 of the drum 30, and the other end of the shaft 90 extends outside a rear portion 21 of the tub 20. The other end of the shaft 90 may be inserted into the pulley 91 to obtain a driving force from the driving motor 40. A motor pulley 41 is provided on a rotating shaft of the driving motor 40. A drive belt 92 is provided between the motor pulley 41 and the pulley 91 such that the shaft 90 may be driven by the drive belt 92.

The driving motor 40 is disposed on one side of a lower portion of the tub 20 to drive the shaft 90 while the drive belt 92 rotates clockwise or counterclockwise in the up-down direction of the tub 20.

A bearing housing 70 is installed on the rear portion 21 of the tub 20 to rotatably support the shaft 90. The bearing housing 70 may be made of aluminum alloy and may be insert molded into the rear portion 21 of the tub 20 when the tub 20 is injection molded.

A drain pump 80 for discharging\water in the tub 20 to the outside of the cabinet 10, a connection hose 82 connecting the tub 20 and the drain pump 80 such that water in the tub 20 may be introduced into the drain pump 80, and a drain hose 84 for guiding water pumped by the drain pump 80 to the outside of the cabinet 10 are provided below the tub 20. The drain pump 80 may drain condensation water generated in a condensation duct 100, which will be described later. This will be described later in detail.

A control panel and a printed circuit board assembly (not shown) are provided at an upper portion of a front surface of the cabinet 10 to allow a user to control the operation of the washing and drying machine 1.

The washing and drying machine 1 includes a condensation duct 100 disposed on a rear side of the tub 20 to condense wet air generated inside the tub 20. In addition, the washing and drying machine 1 includes a drying duct 200 for heating and drying air condensed in the condensation duct 100 (see FIG. 3).

The wet air flowing inside the tub 20 is dried and heated by the condensation duct 100 and drying duct 200 and then supplied into the tub 20 again, so that the washing and drying machine 1 may perform a drying process.

Hereinafter, the condensation duct 100 and the drying duct 200 will be described in detail.

Figure 3:
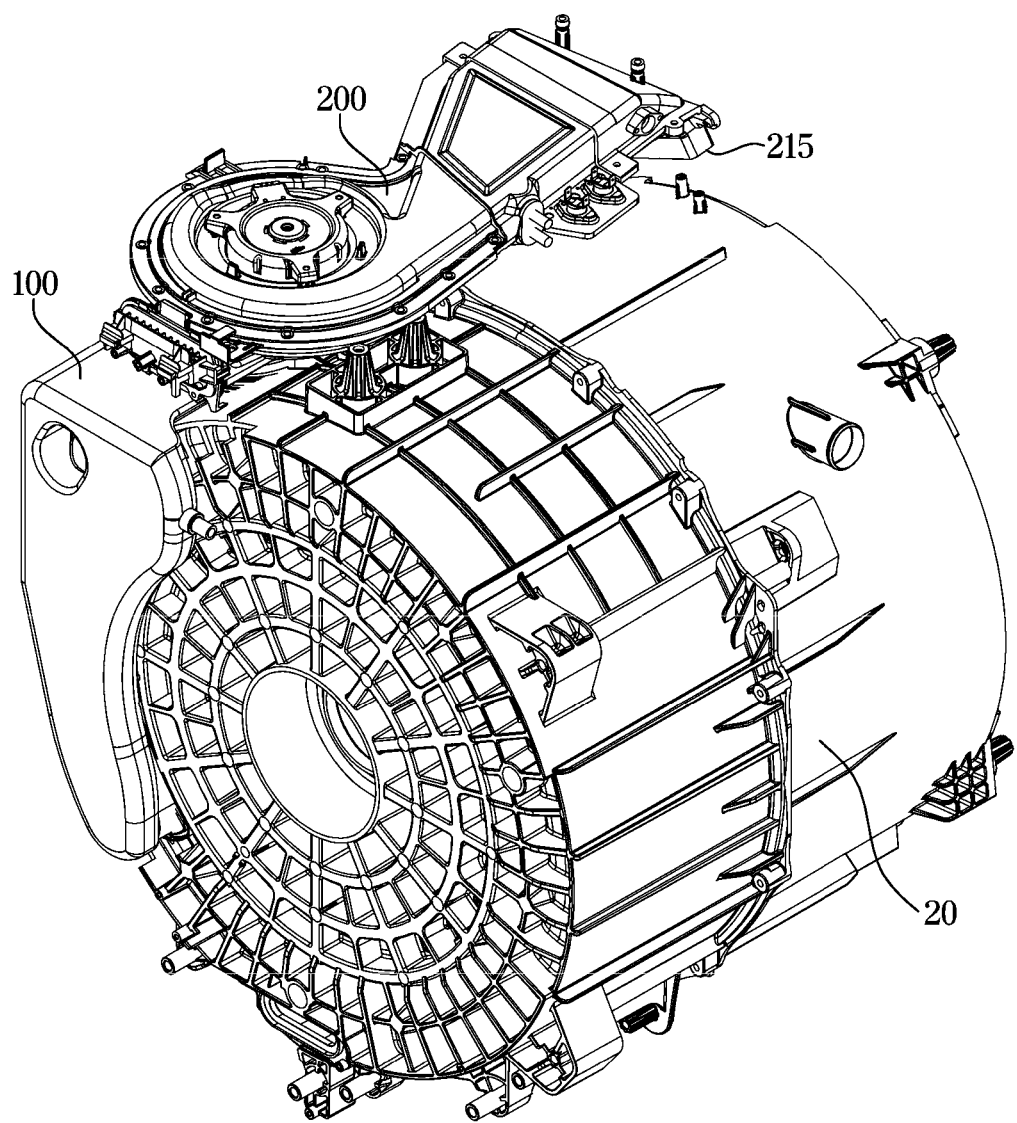
FIG. 3 is a rear perspective view of some components of the washing and drying machine according to an embodiment of the disclosure.
Figure 4:
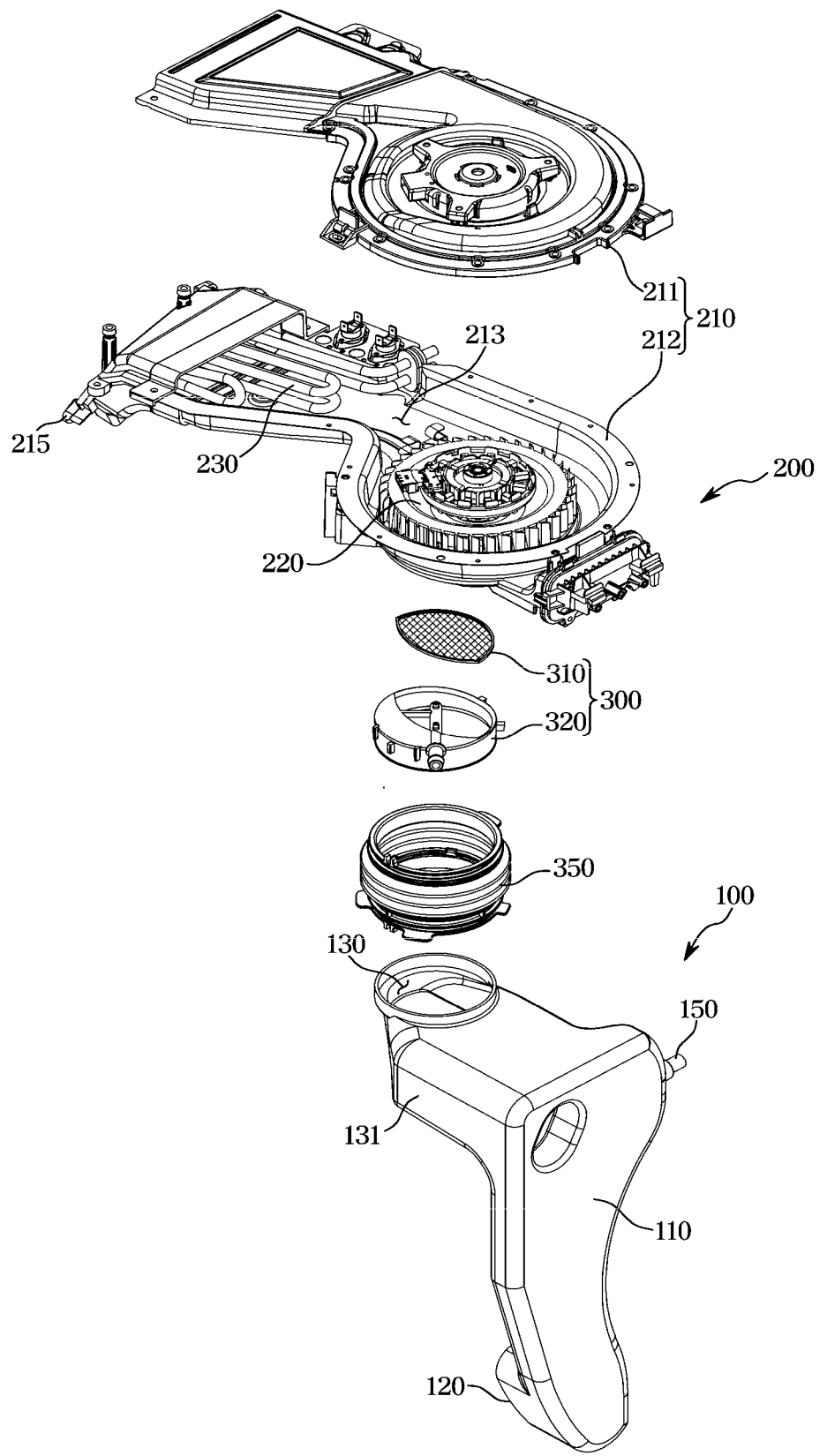
FIG. 4 is an exploded perspective view of some components of the washing and drying machine according to an embodiment of the disclosure.

FIG. 3 is a rear perspective view of some components of the washing and drying machine according to an embodiment of the disclosure, and FIG. 4 is an exploded perspective view of some components of the washing and drying machine according to an embodiment of the disclosure.

As illustrated in FIGS. 3 and 4, the washing and drying machine 1 may include the condensation duct 100 for condensing moisture in air introduced from the drum 30 through the tub 20, the drying duct 200 for heating and drying air introduced from the condensation duct 100, an intermediate member 350 for connecting the condensation duct 100 and the drying duct 200, and a filter unit 300 disposed between the condensation duct 100 and the drying duct 200.

The condensation duct 100 may be disposed on a rear surface of the tub 20. The condensation duct 100 may include a housing 110 extending substantially in the up-down direction from the rear of the tub 20.

Although not shown in FIG. 3, the pulley 91 (see FIG. 2) is disposed on the rear side of the tub 20, and the condensation duct 100 may be disposed on the left rear or right rear of the tub 20 so as not to restrict the rotation of the pulley 91.

Accordingly, the housing 110 may extend in a longitudinal direction that is the up-down direction, from the left or right side of the rear of the tub 20.

The condensation duct 100 may include an inlet 120 connected to the rear surface of the tub 20 and disposed on a lower portion of the housing 110.

The condensation duct 100 may include an outlet 130 connected to the drying duct 200 and disposed on an upper portion of the housing 110.

The condensation duct 100 may include a supply portion 150 for supplying condensation water into the condensation duct 100 such that wet air introduced from the tub 20 through the inlet 120 collides with condensation water so that moisture in air condenses.

The wet air generated in the tub 20 introduced into the condensation duct 100 through the inlet 120 and collides with the condensation water supplied into the condensation duct 100 through the supply portion 150, so that moisture in air may condense.

The condensed air may be discharged to the outlet 130 and introduced into the drying duct 200 through the intermediate member 350 connecting the condensation duct 100 and the drying duct 200.

The drying duct 200 may include a housing 210 extending in the front-rear direction from a top side of the tub 20.

The drying duct 200 may include a fan 220 to suck air from the condensation duct 100 into the drying duct 200.

The drying duct 200 may include a suction port 314 (see FIG. 11) to allow air flowing by the fan 220 to be sucked into the drying duct 200.

The drying duct 200 may include a discharge port 215 for discharging dried air such that the dried air is introduced into the tub 20 and, that is, into the drum 30 again.

The housing 210 may be configured to allow a drying flow path 213 to be formed inside the drying duct 200. The housing 210 may include a first housing 211 and a second housing 212 coupled in the up-down direction.

A heater 230 for heating air sucked into the drying duct 200 by the fan 220 may be provided inside the housing 210.

The fan 220 may be configured such that air flowing into the condensation duct 100 is sucked into the drying duct 200. However, the fan 220 may substantially transmit a suction force to the condensation duct 100 such that air in the tub 20 is introduced into the condensation duct 100.

The air sucked into the drying duct 200 through the suction port 314 is heated by the heater 230 while flowing through the drying flow path 213 and discharged to the outside of the drying duct 200 through the discharge port 215.

Although not shown in the drawing, the discharge port 215 may be connected to a diaphragm (not shown) disposed in the front of the tub 20. Accordingly, high-temperature and low-humidity air is introduced back into the drum 30, and wet air generated again inside the drum 30 may be introduced into the condensation duct 100 again through the tub 20 and through the inlet 120.

The fan 220 may be configured such that wet air remaining inside the drum 30 or the tub 20 circulates back through the condensation duct 100 and drying duct 200 to the drum 30 or the tub 20. The condensation duct 100 and the drying duct 200 may be configured such that the circulating wet air becomes in a high temperature and low humidity state.

The intermediate member 350 may connect the condensation duct 100 and the drying duct 200. The intermediate member 350 may connect the outlet 130 of the condensation duct 100 and the suction port 315 of the drying duct 200.

The intermediate member 350 may be configured in a bellows shape such that the condensation duct 100 or the drying duct 200 is not damaged by vibrations generated in a washing process of the washing and drying machine 1.

The filter unit 300 may be provided between the condensation duct 100 and the drying duct 200. In detail, the filter unit 300 may be disposed between the intermediate member 350 and the suction port 314 of the drying duct 200 (see FIG. 11).

However, the disclosure is not limited thereto. For example, the filter unit 300 may be disposed between the outlet 130 of the condensation duct 100 and the intermediate member 350 and may be disposed inside the intermediate member 350.

The filter unit 300 may include a filter 310 and a filter cleaning portion 320 for cleaning the filter 310. This will be described later in detail.

Hereinafter, the condensation duct 100 and a process of condensing air inside the condensation duct 100 will be described in detail.

Figure 5:
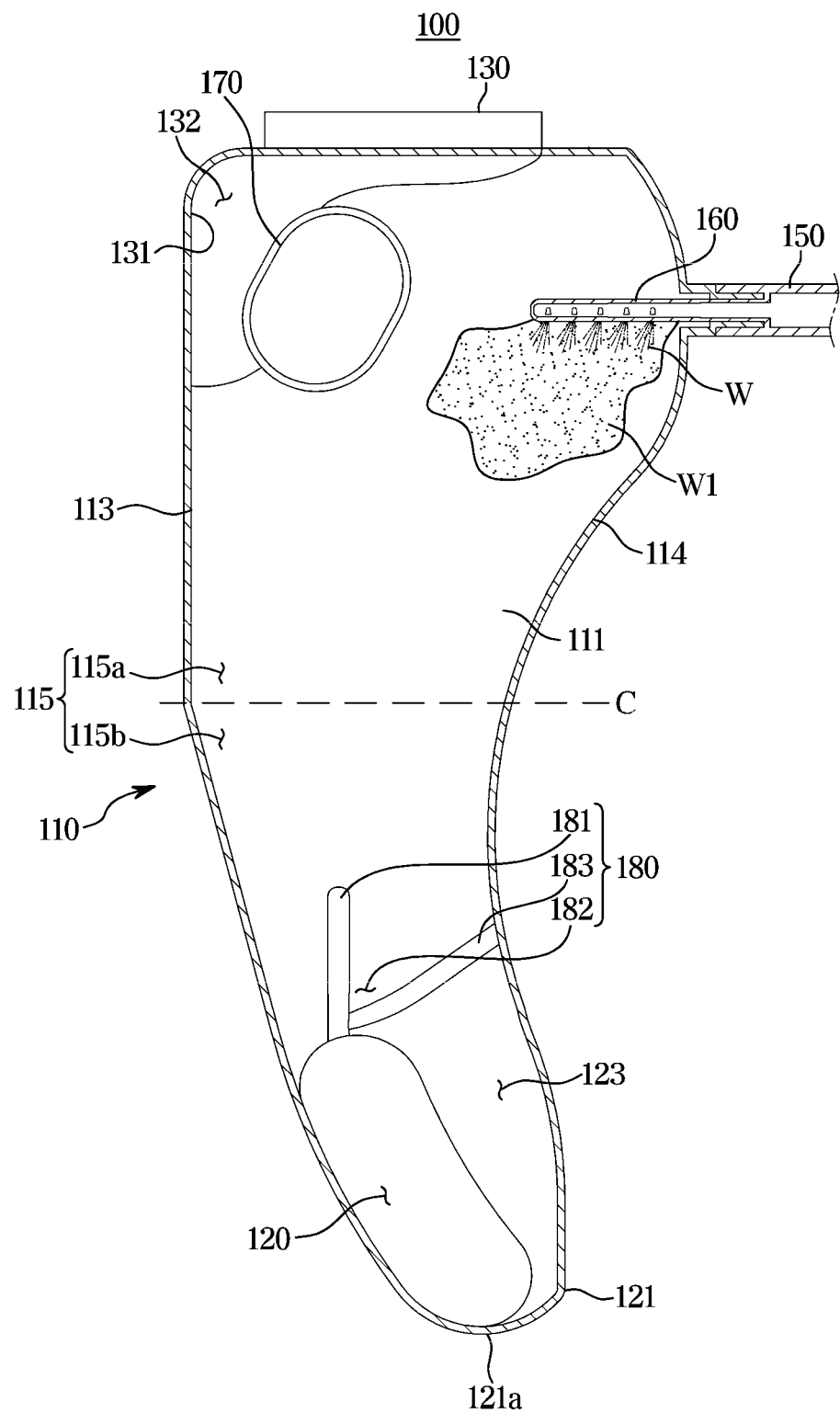
FIG. 5 is a cross-sectional view of a condensation duct of the washing and drying machine according to an embodiment of the disclosure.
Figure 6:
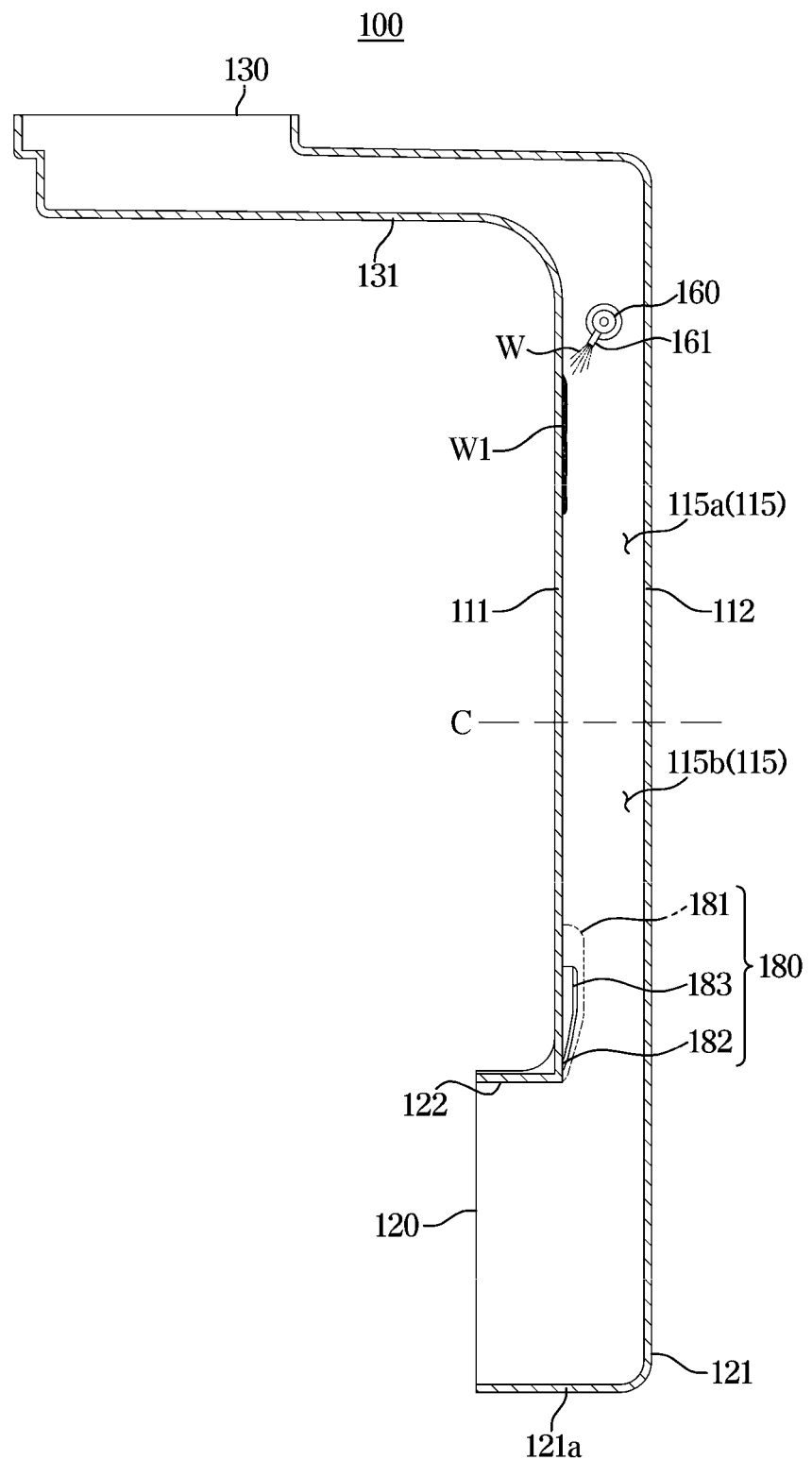
FIG. 6 is a side cross-sectional view of the condensation duct of the washing and drying machine according to an embodiment of the disclosure.
Figure 7:
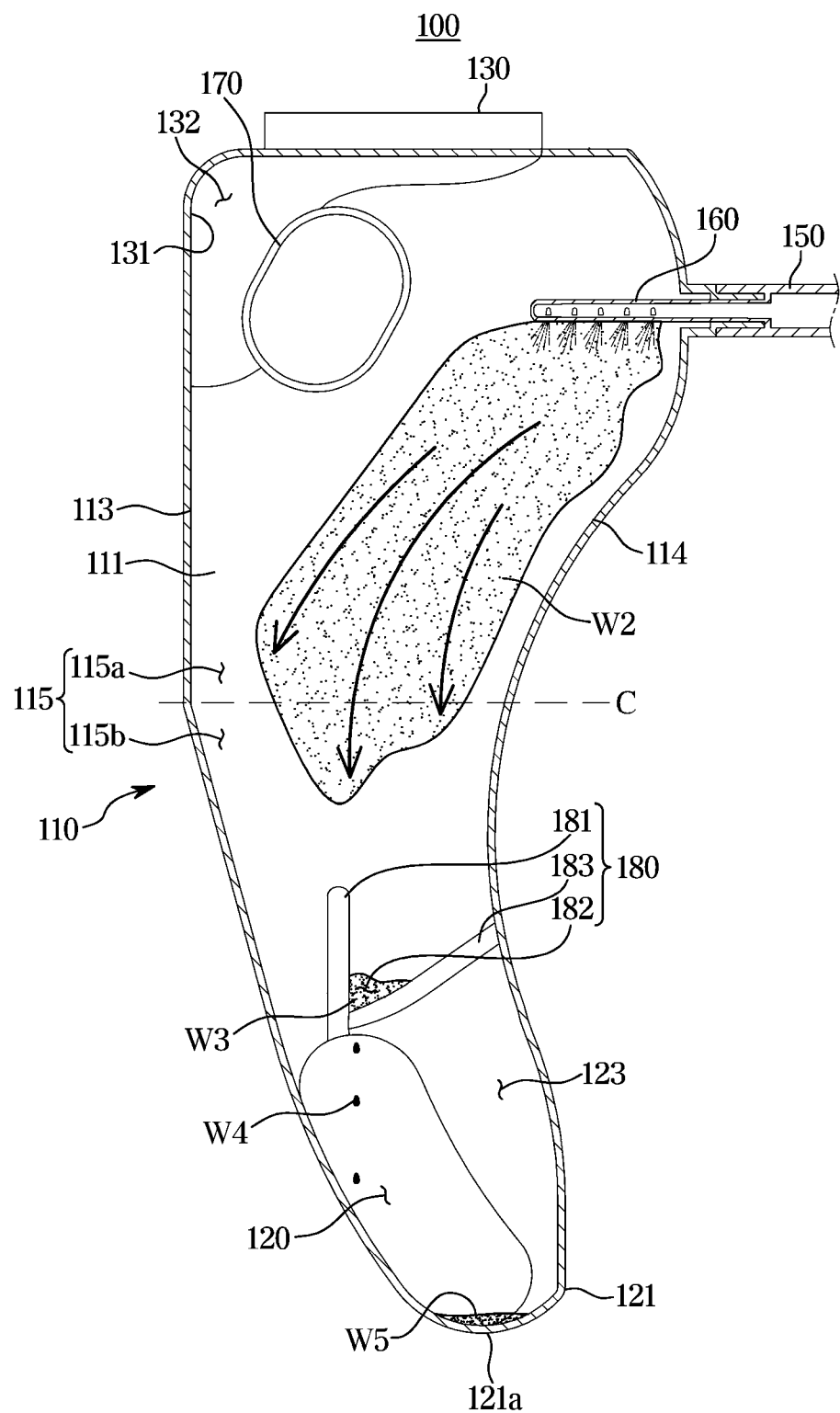
FIG. 7 is a cross-sectional view of the condensation duct illustrating a state in which condensation water is sprayed inside the condensation duct of the washing and drying machine according to an embodiment of the disclosure.
Figure 8:
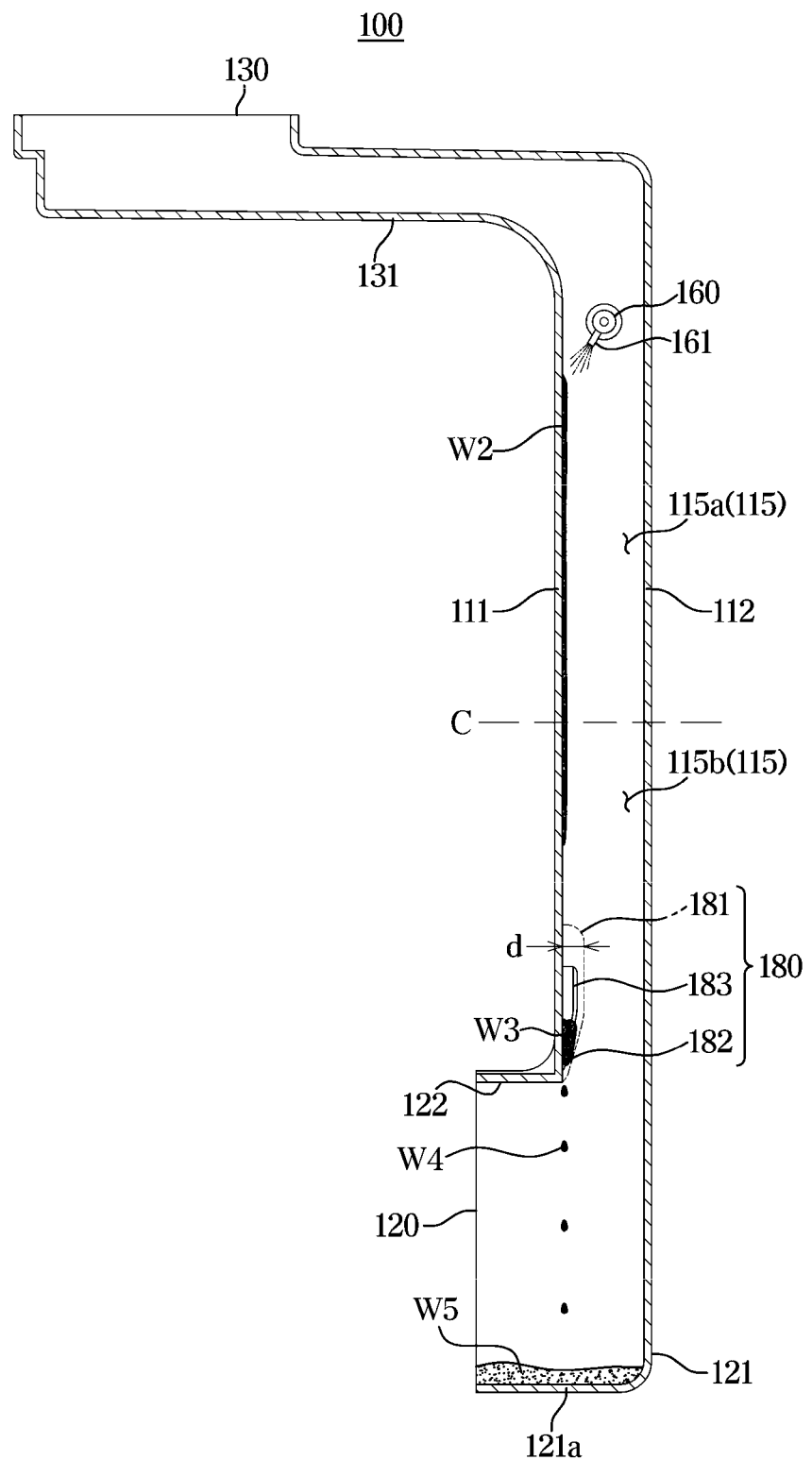
FIG. 8 is a side cross-sectional view of the condensation duct illustrating a state in which condensation water is sprayed inside the condensation duct of the washing and drying machine according to an embodiment of the disclosure.
Figure 9:
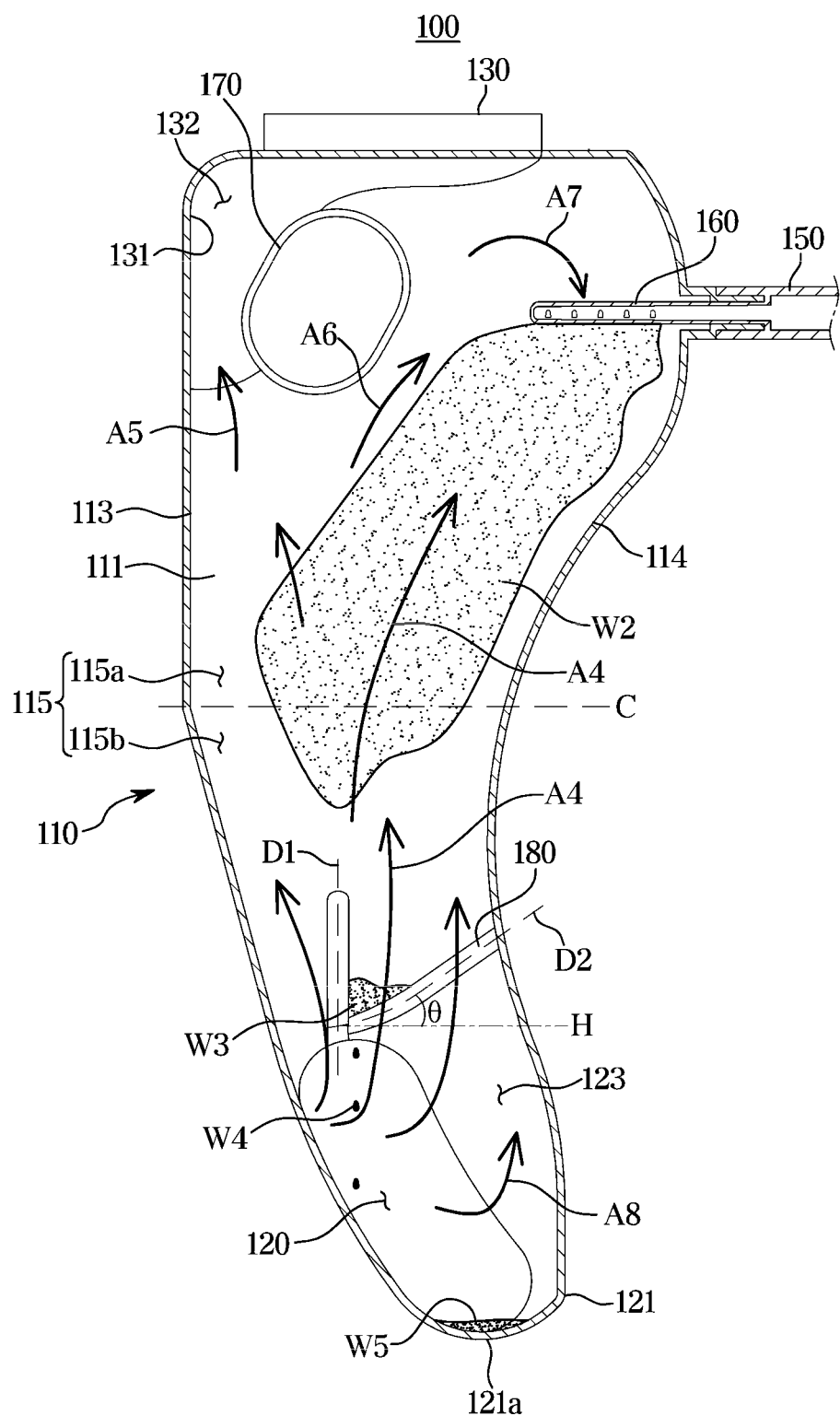
FIG. 9 is a cross-sectional view of the condensation duct illustrating a state in which air flows inside the condensation duct of the washing and drying machine according to an embodiment of the disclosure.
Figure 10:
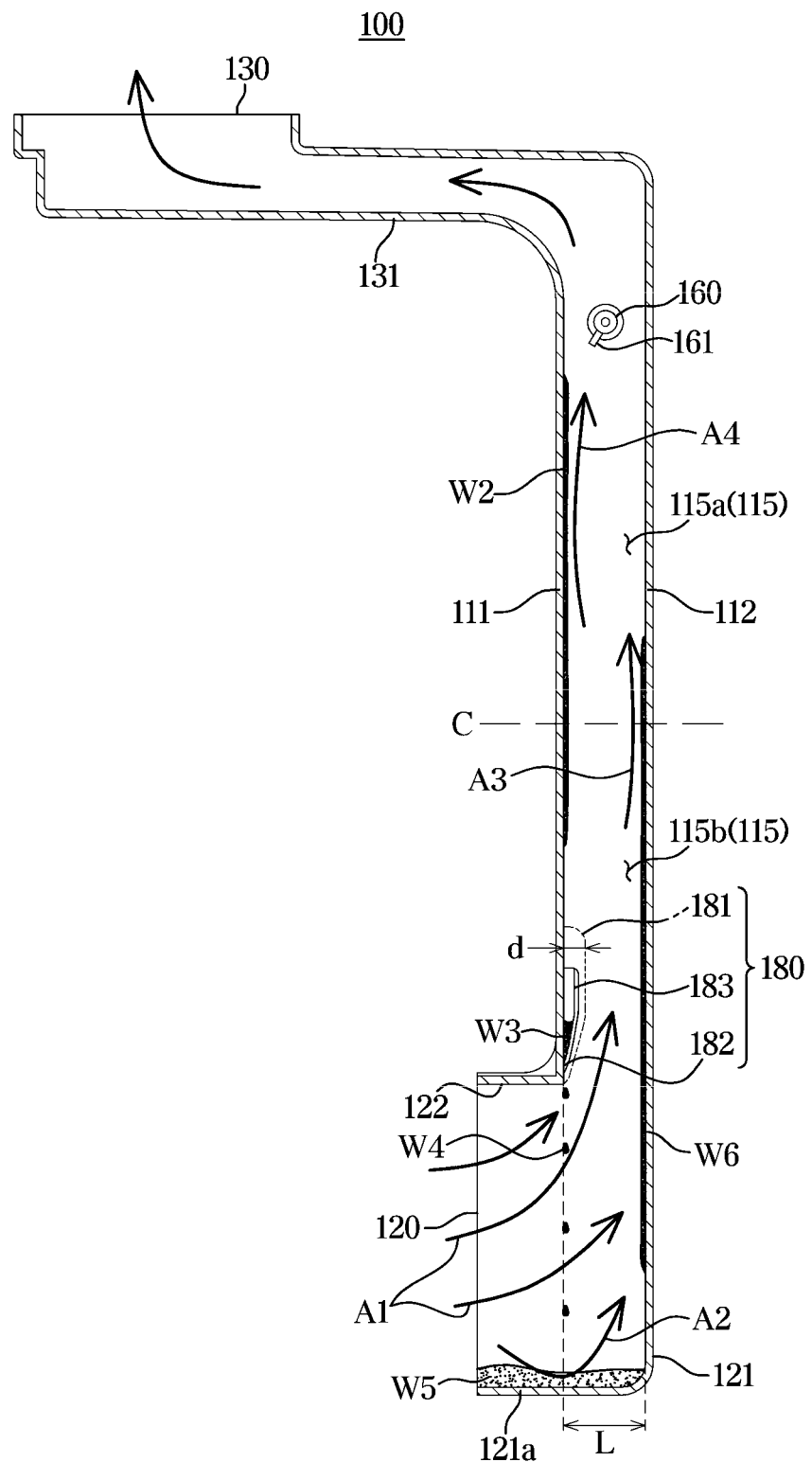
FIG. 10 is a side cross-sectional view of the condensation duct illustrating a state in which air flows inside the condensation duct of the washing and drying machine according to an embodiment of the disclosure.

FIG. 5 is a cross-sectional view of a condensation duct of the washing and drying machine according to an embodiment of the disclosure, FIG. 6 is a side cross-sectional view of the condensation duct of the washing and drying machine according to an embodiment of the disclosure, FIG. 7 is a cross-sectional view of the condensation duct illustrating a state in which condensation water is sprayed inside the condensation duct of the washing and drying machine according to an embodiment of the disclosure, FIG. 8 is a side cross-sectional view of the condensation duct illustrating a state in which condensation water is sprayed inside the condensation duct of the washing and drying machine according to an embodiment of the disclosure, FIG. 9 is a cross-sectional view of the condensation duct illustrating a state in which air flows inside the condensation duct of the washing and drying machine according to an embodiment of the disclosure, and FIG. 10 is a side cross-sectional view of the condensation duct illustrating a state in which air flows inside the condensation duct of the washing and drying machine according to an embodiment of the disclosure.

The type of washing and drying machine that condenses moisture in air through the condensation duct has a problem that condensation efficiency of the condensation duct is not good, so that wet air is recirculated into the drum or tub, resulting in a decrease in drying efficiency.

In the case of the prior art, in order to solve this problem, a method of intentionally limiting the flow of air flowing inside the condensation duct by forming a plurality of ribs in the condensation duct in order to increase the amount of collision between condensation water in the condensation duct and wet air flowing inside the condensation duct is used.

Alternatively, a method of securing the maximum amount of time that air and condensation water may collide by forming a long flow path in which air flows inside the condensation duct is used.

However, the above methods have difficulty in improving the drying efficiency as the flow rate per hour of the circulated air decreases by the condensation duct because the flow of air in the condensation duct is lowered.

In addition, although there is a method of increasing the capacity of the condensation duct to increase the flow rate inside the condensation duct, as described above, the condensation duct is disposed in the rear of the tub and is provided such that the driving of the pulley and the drive belt disposed in the rear of the tub is not limited, so that the condensation duct has a limitation in increasing capacity in the left-right direction of the washing and drying machine.

In addition, because a rear surface of the cabinet is disposed in the rear of the tub, the condensation duct has a limitation in increasing the capacity in the front-rear direction of the washing and drying machine. This is because the condensation duct and the cabinet may collide due to vibration occurring when the drum rotates at a high speed, such as a dehydration process in a washing and drying machine so that the condensation duct may be damaged. Therefore, the condensation duct not be formed over a predetermined length in the front-rear direction of the washing and drying machine.

The condensation duct 100 of the washing and drying machine according to an embodiment of the disclosure is provided to increase condensation efficiency at a limited condensation duct size.

The condensation duct 100 having a constant condensing cross section in the front-rear direction may maximize the condensation efficiency by maximizing the collision between the condensation water falling in the condensation duct 100 and the air being raised by the fan 220.

As illustrated in FIGS. 5 and 6, the housing 110 may include a first surface 111 disposed adjacent to the rear surface of the tub 20, and a second surface 112 disposed to face the first surface 111 in the front-rear direction.

The housing 110 may include a first side surface 113 connecting the first surface 111 and the second surface 112 in the left-right direction and forming one side surface of the housing 110, and a second side surface 114 disposed to face the first side surface 113 in the left-right direction.

The housing 110 may be manufactured by a blow method. However, the disclosure is not limited thereto, and a plurality of the housings 110 may be configured to be coupled to each other. It may be appropriate that a thickness of the housing 110 is approximately 20 mm or less.

The housing 110 may include a condensation flow path 115 formed inside the housing 110.

The inlet 120 may be provided to be opened toward the front from the first surface 111. The inlet 120 may be disposed at a lower end of the housing 110.

The inlet 120 may be substantially provided on a connection portion 122 extending toward the front on the first surface 111 to be connected to the tub 20. The housing 110 may include the connection portion 122 disposed at the lower portion of the housing 110 and extending in a direction, in which the tub 20 is disposed, to be connected to the tub 20.

The inlet 120 may include an inner space of the connection portion 122 in communication with the housing 110 through the connection portion 122 from an opening as well as the opening formed wholly in the front of the connection portion 122.

However, the disclosure is not limited thereto, and the housing 110 does not include the connection portion 122, and the inlet 120 may be formed by cutting the first surface 111. In this case, an additional connection member connecting the tub 20 and the inlet 120 may be provided, or the inlet 120 and the tub 20 may be directly connected.

The outlet 130 may be disposed at an upper end of the housing 110. In detail, the housing 110 includes an extension portion 131 extending toward the front from the upper portion of the housing 110, and the outlet 130 may be provided at an upper end of the extension portion 131.

The outlet 130 may be disposed at a front portion of the extension portion 131. The extension portion 131 may extend toward the front from the housing 110 to a position where the fan 220 is disposed substantially in the up-down direction.

An extension flow path 132 extending from the condensation flow path 115 may be provided inside the extension portion 131. The extension flow path 132 may be regarded as one region of the condensation flow path 115, but is divided for convenience of explanation. In detail, the extension flow path 132 is a partial region of the condensation flow path 115 formed inside the extension portion 131.

The condensation duct 100 may include the supply portion 150 provided to allow condensation water to be supplied from the outside.

The condensation duct 100 may include a supply nozzle 160 connected to the supply portion 150 and configured to spray condensation water W supplied from the supply portion 150 into the condensation duct 100.

The supply nozzle 160 may be disposed on the upper portion of the housing 110. This is to maximize a distance that the condensation water W sprayed by the supply nozzle 160 falls from the inside of the housing 110 to the bottom of the housing 110, thereby maximizing the chances that the condensation water W may collide with air flowing through the condensation flow path 115.

The condensation flow path 115 may include a first region 115a and a second region 115b based on a center line C passing through the middle of the housing 110 approximately in the longitudinal direction (i.e., the up-down direction) of the housing 110.

The first region 115a is the condensation flow path 115 positioned on the upper portion of the housing 110 based on the center line C, and the second region 115b is the condensation flow path 115 positioned on the lower portion of the housing 110 based on the center line C.

The inlet 120 may be disposed in the second region 115b. The outlet 130 and the supply nozzle 160 may be disposed in the first region 115a.

The outlet 130 may be disposed adjacent to the first side surface 113. The supply nozzle 160 may be disposed on the second side surface 114.

That is, the outlet 130 and the supply nozzle 160 may be disposed to be spaced apart from each other by a predetermined distance. This is to prevent the condensation water W sprayed from the supply nozzle 160 from flowing out of the condensation duct 100 directly through the outlet 130 without collision with air.

When the supply nozzle 160 and the outlet 130 are disposed adjacent to each other, the condensation water sprayed from the supply nozzle 160 is directly introduced into the drying duct 200 through the outlet 130 to reduce the condensation efficiency.

However, the disclosure is not limited thereto, and the supply nozzle 160 may be disposed on the first side surface 113, and in this case, the outlet 130 may be disposed adjacent to the second side surface 114.

The supply nozzle 160 includes a spray portion 161 through which the condensation water W is sprayed, and the spray portion 161 is disposed to face the first surface 111 to spray the condensation water W toward the first surface 111.

The condensation water W may be sprayed by the supply nozzle 160 to be placed in a first position W1 where the condensation water W starts to contact the first surface 111. The first position W1 may not be defined as a specific position and is a position for comprehensively describing the first position of the condensation water W colliding with the first surface 111 by the supply nozzle 160.

The first position W1 is located in the first region 115a and may be positioned at a height substantially corresponding to the supply nozzle 160 in the up-down direction.

The condensation duct 100 may include a rib 180 disposed in the second region 115b.

The rib 180 may be disposed above the inlet 120.

The rib 180 may include a first rib 181 extending substantially in the up-down direction and a second rib 183 extending to be inclined substantially from a lower end of the first rib 181 with respect to the up-down direction.

In detail, the first rib 181 may be provided to extend upward from an upper end of the inlet 120. It may be appropriate that the first rib 181 extends upward from a central portion of the upper end of the inlet 120.

The rib 180 may protrude from the first surface 111 toward the second surface 112. In order to reduce the resistance of air introduced into the condensation duct 100, the rib 180 may extend only to a predetermined length toward the second surface 112. The rib 180 may be integrally formed with the housing 110 when the housing 110 is manufactured by the blow method. It may be appropriate that the rib 180 has a thickness of approximately 20 mm or less. This is to minimize the restriction of the flow of air in the condensation duct 100.

The rib 180 may include a gathering portion 182 formed between the first rib 181 and the second rib 183.

The gathering portion 182 may be defined as a space formed by connecting the lower end of the first rib 181 and a lower end of the second rib 183.

As will be described later, the gathering portion 182 may be provided to be collected in the gathering portion 182 while the condensation water W placed in the first position W1 falls.

As illustrated in FIGS. 7 and 8, the condensation water W placed in the first position W1 may drop to the second region 115b by its own weight.

That is, the condensation water W may flow to a lower portion of the condensation flow path 115 along the first surface 111. The condensation water W may move downward along the first surface 111 and fall to a second position W2 expanding from the first region 115a to the second region 115b.

The second position W2 is not limited to a specific position and may be defined as any region where condensation water W may be distributed from the first region 115a to the second region 115b on the first surface 111.

Because the condensation water W flows through the entirety of the first surface 111 when moving to the second position W2, as will be described later, a contact area capable of contacting air introduced into the condensation duct 100 may be widened.

The condensation water W reaching the second position W2 may continue to fall by its own weight, and a part thereof may fall to the gathering portion 182 of the rib 180 to be collected in the gathering portion 182.

A position at which condensation water W is collected in the gathering portion 182 may be defined as a third position W3.

As described above, the gathering portion 182, which is a space formed by the first rib 181 and the second rib 183, is a space opened toward the direction of the second surface 112. When a predetermined amount of the condensation water W is collected in the gathering portion 182, the condensation water W may drop downward.

That is, the condensation water W placed in the third position W3 temporarily stays at the third position W3 due to the surface tension, and when the condensation water W continuously flows into the third position W3, the condensation water W placed in the third position W3 may gradually drop to the inlet 120 side by its own weight.

A position where the condensation water W falls from the third position W3 may be defined as a fourth position W4. The fourth position W4 is a region including all positions where the condensation water W may be placed during the fall.

The fourth position W4 is a region corresponding to the inlet 120 in the front-rear direction. As the rib 180 is disposed above the inlet 120, the fourth position W4 may be intensively formed in the region corresponding to the inlet 120 in the front-rear direction.

As will be described later, air flowing to the condensation duct 100 is introduced into the condensation duct 100 through the inlet 120, and the condensation water W placed in the fourth position W4 may easily collide with the introduced air. Accordingly, the possibility that air and the condensation water W collide within the condensation duct 100 may increase and the condensing efficiency of the condensation duct 100 may increase.

A collecting portion 121 in which the condensation water W falling through the fourth position W4 is collected may be provided at the lower portion of the housing 110 or a lower portion of the inlet 120.

A position where the condensation water W is collected in the collecting portion 121 may be defined as a fifth position W5.

A lower end 121a of the collecting portion 121 may be formed horizontally in the front-rear direction. Accordingly, the collecting portion 121 may temporarily collect the condensation water W placed in the fifth position W5.

When the lower end 121a of the collecting portion 121 is not disposed horizontally in the front-rear direction, but is disposed inclined downward in the direction of the tub 20 as in the prior art, the condensation water W is not collected in the collecting portion 121, all the condensation water W is introduced into the tub 20, and the condensation water W placed in the fifth position W5 does not exist.

When the amount of the condensation water W falling from the fourth position W4 increases, a part of the condensation water W placed in the fifth position W5 may be introduced into the tub 2 through the inlet 120 and then introduced into the drain pump 80 connected to the tub 2 to be discharged to the outside of the tub 2.

As such, as the supply nozzle 160 sprays the condensation water W on the first surface 111, the condensation water W may be placed in the second position W2 generally formed on the first surface 111, in the third position W3 formed by the rib 180 disposed above the inlet 120, in the fourth position W4, which is the position where the condensation water W falls from the third position W3, and in the fifth position W5 where the condensation water W is collected in the collecting portion 121.

As will be described later, as the condensation water W is additionally placed in the third position W3, the fourth position W4 and the fifth position W5 by the rib 180, a condensation area where the condensation water W collides with air introduced into the condensation duct 100 to condense moisture in the air may increase. Accordingly, the condensation efficiency of the condensation duct 100 may increase. This will be described in detail together with the flow of air introduced into the condensation duct 100.

As illustrated in FIGS. 9 and 10, the air introduced into the condensation duct 100 may flow to an upper portion of the condensation flow path 115 through the inlet 120 by the fan 220 and then flow out of the condensation duct 100 through the extension flow path 132 and the outlet 130.

Air passing through the inlet 120 may collide with the condensation water W placed in the fourth position W4. As described above, this is because the rib 180 is disposed above the inlet 120 and is configured such that the condensation water W falls to the inlet 120 side.

The fourth position W4 is formed on the flow path of air, and moisture in the air passing through the inlet 120 may be condensed by colliding with the condensation water W placed in the fourth position W4.

Also, the condensation water W other than the condensation water W that is condensed and dropped may collide with the second surface 112 by moving with an upward airflow.

That is, when a part of the condensation water W placed in the fourth position W4 moves with air and the air collides with the second surface 112, the condensation water W may remain on the second surface 112.

A position where the condensation water W moves to the second surface 112 by an airflow in the condensation duct 100 may be defined as a sixth position W6. The sixth position W6 does not limit a specific position, but may include all regions where the condensation water W moved to the second surface 112 by the airflow is located.

That is, one part air A1 of air passing through the inlet 120 may collide with the condensation water W placed in the fourth position W4.

One part of the condensation water W colliding with the one part air A1 may collide with moisture in the one part air A1 and drop, and the other part of the condensation water W may flow with the one part air A1 and collide with the second surface 112. The condensation water W colliding with the second surface 112 remains on the second surface 112 and the one part air A1 may flow upward by the fan 220.

The other part air A2 of the air passing through the inlet 120 may collide with the condensation water W collected in the fifth position W5 while passing through the inlet 120.

One part of the condensation water W colliding with the other part air A2 may collide with moisture in the other part air A2 and remain in the collecting portion 121, and the other part of the condensation water W may flow with the other part air A2 and collide with the second surface 112.

Accordingly, the sixth position W6 may be generally formed in a region corresponding to the second region 115b on the second surface 112.

As described above, the condensation duct 100 is formed between the rear surface of the tub 20 and the rear surface of the cabinet 10, and thus a width of the housing 110 may not be formed wide in the front-rear direction. Accordingly, a length L in the front-rear direction of the condensation flow path 115 formed inside the housing 110 may be short.

Accordingly, most of the air introduced into the condensation duct 100 through the inlet 120 may move upward after colliding with the second surface 112 because the length L in the front-rear direction of the condensation flow path 115 is short.

Most air A3 of the air passing through the inlet 120 may collide with a region corresponding to the second region 115b on at least the second surface 112.

At this time, the air A3 colliding with the second surface 112 may collide with the condensation water W placed in the sixth position W6 on the second surface 112, so that moisture in the air A3 may be effectively condensed.

Also, air A4 that does not collide with the second surface 112 among the air passing through the inlet 120 also collides with the condensation water W placed in the third position W3 or the condensation water W placed in the second position W2 on the first surface 111, so that moisture in the air A4 may be effectively condensed.

As the rib 180 is disposed in the second region 115b, in detail adjacent to the upper side of the inlet 120 in the up-down direction, the condensation water W may be temporarily placed in the fourth position W4, and thus the condensation water W may easily move to the second surface 112.

Therefore, the condensation area in which the condensation water W and air in the condensation duct 100 may collide without a separate configuration for restricting the flow of air in the condensation duct 100 may be formed wide, so that the condensing efficiency of the condensation duct 100 may effectively increase while maintaining a constant flow rate in the condensation duct 100.

The first rib 181 may extend in a first direction D1 substantially corresponding to the up-down direction. The first rib 181 may form the gathering portion 182 together with the second rib 183, but additionally, the first rib 181 may guide an airflow direction of the air passed through the inlet 120.

As described above, the extension portion 131 is disposed adjacent to the first side surface 113, and thus the airflow in the condensation flow path 115 may generate a strong upward airflow in a region adjacent to the first side surface 113.

Therefore, the air passed through the inlet 120 may flow substantially toward the first side surface 113 based on the left-right direction, and at this time, the first rib 181 may guide a part of the air flowing to the first side surface 113 in the upper side direction, in detail, the direction of the second side surface 114.

The first direction D1 is directed to a direction substantially corresponding to the up-down direction, but the disclosure is not limited thereto and may be directed to be inclined at a predetermined angle toward the second side surface 114. In this case, the first rib 181 may guide a larger amount of air to the second side surface 114.

The second rib 183 may extend in a second direction D2 inclined toward the second side surface 114 with respect to the first direction D1. The second direction D2 may be a direction having an angle of about 0 to 60 degrees with respect to a horizontal H.

A capacity of the gathering portion 182 may be determined according to an inclination angle of the second rib 183 with respect to the first rib 181.

The capacity of the gathering portion 182 may be provided such that the condensation water W may fall in a droplet shape when the condensation water W falls from the gathering portion 182 to the collecting portion 121. The gathering portion 182 may be configured such that the condensation water W of about 10 cc to 100 cc may be temporarily collected in the gathering portion 182.

A length d between the first rib 181 and the second rib 183 in the front-rear direction may be substantially about 15 mm. This is to facilitate the flow of air in the condensation flow path 115. When the length d between the first rib 181 and the second rib 183 in the front-rear direction is more than a predetermined length, the flow rate of air in the condensation duct 100 may be lowered by interfering with the flow of air in the condensation flow path 115.

This is to maximize the collision between the condensation water W placed in the fourth position W4 and the air introduced through the inlet 120. Accordingly, condensation of the introduced air itself is easy, and the condensation area in the condensation flow path 115 may efficiently increase by moving the condensation water W to the second surface 112.

The condensation duct 100 may include a blocking portion 170 disposed in the first region 115a and configured to partially restrict the flow of air on the condensation flow path 115.

The blocking portion 170 may be provided in the shape of a hollow pillar extending in the front-rear direction of the washing and drying machine 1.

The blocking portion 170 is configured such that when the washing and drying machine 1 is transported, a fixing member for fixing the condensation duct 100 to the tub 20 is penetrated.

That is, the fixing member may penetrate the hollow portion of the blocking portion 170 to be coupled to the rear surface of the tub 20, and thus the condensation duct 100 is fixed to the tub 20 to prevent the condensation duct 100 from being separated and damaged when the washing and drying machine 1 is transported.

However, the disclosure is not limited thereto, and the blocking portion 170 is not configured to be coupled to the fixing member, but may be simply configured to restrict the flow of air in the condensation flow path 115.

An outer surface of the pillar may restrict the flow of air in the condensation flow path 115. In detail, the outer surface of the pillar may change the direction of a rising airflow to the first side surface 113 and the second side surface 114.

The blocking portion 170 may guide the part air A5 toward the first side surface 113 and the part air A6 toward the second side surface 114.

The blocking portion 170 may be disposed closer to the first side surface 113 than the second side surface 114 in the left-right direction. Accordingly, a region adjacent to the second side surface 114 may be formed wider than a region adjacent to the first side surface 113 in the left-right direction based on the blocking portion 170.

Therefore, the amount of air rising in the direction of the second side surface 114 may increase more than the amount of air rising in the direction of the first side surface 113 based on the left-right direction.

This is because the part air A6 flowing in the direction of the first side surface 113 is guided in the direction of the second side surface 114 by the blocking portion 170 as the blocking portion 170 is disposed adjacent to the first side surface 113.

As described above, the extension flow path 132 may be disposed adjacent to the first side surface 113. Therefore, the air flow rising in the direction of the first side surface 113 may flow directly to the outlet 130 through the extension flow path 132.

In this case, moisture in air flowing to the outlet 130 may flow out of the condensation duct 100 without being condensed.

However, the blocking portion 170 may form an airflow such that most of the rising air directs toward the second side surface 114, so that the air flowing in the direction of the second side surface 114 may additionally collide with the condensation water W while colliding with an inner surface of the housing 110.

That is, the condensation area in which air may collide with the condensation water W before flowing to the outlet 130 is additionally secured, so that the condensation efficiency of the condensation duct 100 may increase.

The supply nozzle 160 is provided on the second side surface 114, and thus a large amount of the condensation water W is distributed in the region adjacent to the second side surface 144 as in the second position W2. Accordingly, the possibility that a part air A7 additionally collides with the condensation water W while flowing in the direction of the second side surface 114 may increase.

A closed portion 123 not opened to the outside, which is a space in which the air flowing in the condensation duct 100 and the condensation water W may additionally collide, may be provided at one side surface of the inlet 120 in the left-right direction.

The inlet 120 may be disposed at a position corresponding to the fourth position W4 in the up-down direction. The closed portion 123 is formed in a region corresponding to the fourth position W4 in the left-right direction, so that air in the condensation duct 100 may collide with the condensation water W while circulating along the closed portion 123.

Accordingly, air may rise to the outlet 130 side after moisture in the air is sufficiently condensed at a lower portion of the second region 115b. When the inlet 120 is formed to extend in the left and right directions without the closed portion 123, air may move upwards without sufficiently condensing moisture in the air at the lower portion of the second region 115b, thereby reducing the condensation efficiency.

A width of the first region 115a in the left-right direction may be formed wider than a width of the second region 115b. Accordingly, air may flow faster in the second region 115b than in the first region 115a.

Even if air flows faster in the second region 115b, the condensation water W may be distributed in the second position W2, the third position W3, the fourth position W4, the fifth position W5, and the sixth position W6, so that even in the flow of fast flowing air, the condensation region where air and the condensation water W may collide may be secured to the maximum, thereby easily condensing moisture in the air.

Hereinafter, the filter unit 300 according to an embodiment of the disclosure will be described.

Figure 11:
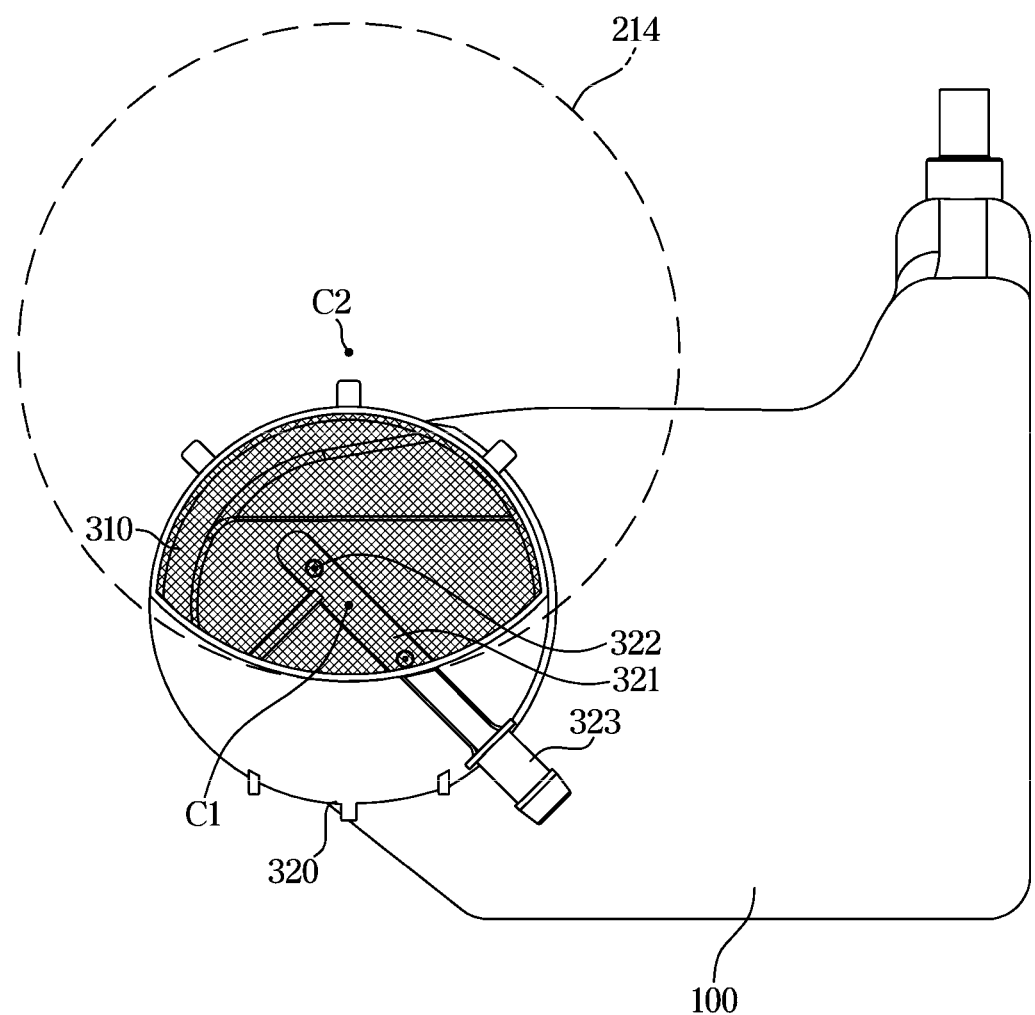
FIG. 11 is a view illustrating the condensation duct, a filter, and a suction port of a drying duct of the disclosure.

FIG. 11 is a view illustrating the condensation duct, a filter, and a suction port of a drying duct of the disclosure.

As described above, the filter unit 300 may be disposed between the drying duct 200 and the condensation duct 100. In detail, the filter unit 300 may be disposed between a suction port 214 formed below the fan 220 and an upper end of the intermediate member 350 (see FIG. 4).

The filter 310 may prevent foreign substances contained in air introduced from the tub 20 from being introduced into the drying duct 200 through the condensation duct 100. The foreign substances in air introduced into the condensation duct 100 may be separated together with moisture in the air when colliding with the condensation water.

However, a part of the foreign substances contained in the air may flow out of the condensation duct 100 through the outlet 130 together with the air.

As such, the filter unit 300 may be disposed between the suction port 314 of the drying duct 200 and the outlet 130 of the condensation duct 100 to prevent air containing foreign substances from flowing into the drying duct 200.

The filter unit 300 may include the filter 310 to collect foreign substances and the filter cleaning portion 320 to clean the filter 310.

The filter cleaning portion 320 may be disposed below the filter 310 in the up-down direction.

The filter cleaning portion 320 may include a washing water supply portion 323 to receive washing water from the outside, and a cleaning nozzle 321 to spray the washing water supplied from the washing water supply portion 323 to the filter 310.

The cleaning nozzle 321 may include a washing water spray portion 322 through which washing water is sprayed. The washing water spray portion 322 may be disposed upward to spray washing water in an upward direction.

The filter 310 is disposed below the suction port 214, and thus foreign substances may be collected on a lower surface of the filter 310.

As the cleaning nozzle 321 sprays washing water upward, the foreign substances collected on the lower surface of the filter 310 may drop downward together with the washing water and be introduced into the condensation duct 100 through the intermediate member 350.

The foreign substances introduced into the condensation duct 100 may be finally placed in the collecting portion 121 together with the condensation water W and then may be introduced into the tub 20 to be discharged to the outside of the washing and drying machine 1.

However, the disclosure is not limited thereto, and the filter cleaning portion 320 may be disposed above the filter 310. In this case, the drying duct 200, the filter cleaning portion 320, the filter 310, and the condensation duct 100 may be sequentially arranged from the upper side.

When the filter cleaning portion 320 is disposed above the filter 310, the cleaning water spray portion 322 may be disposed downward such that the cleaning nozzle 321 sprays washing water toward the filter 310.

In this case, the washing water is sprayed downward from the washing water spray portion 322, the amount of washing water directing to the drying duct 200 is reduced so that drying performance may not be lowered even during the drying process.

The suction port 214 may be formed to correspond substantially to a radius of the fan 220. This is to maximize the flow rate of air sucked by the fan 220.

The suction port 214 and the outlet 130 may be provided in a circular shape. In this case, a center C2 of the suction port 214 and a center C1 of the outlet 130 are not positioned to overlap in the up-down direction.

That is, only partial regions of the suction port 214 and the outlet 130 may overlap in the up-down direction.

Moisture may be contained in the air rising through the outlet 130 to prevent the moisture contained in the air from being directly sucked into the suction port 214.

A part of the rising air may be raised to a region that does not overlap the suction port 214 in the up-down direction, and in this case, the air may collide with a portion that is not opened in the up-down direction in the filter cleaning portion 320.

Moisture may be removed from the air colliding with the filter cleaning portion 320, and the air from which the moisture has been removed may be sucked into the suction port 214.

As the air introduced into the suction port 214 passes through the filter 310, foreign substances and moisture in the air may be separated through the filter 310.

Hereinafter, the condensation duct 100 of the washing and drying machine 1 according to second and third embodiments of the disclosure will be described. Configurations other than the condensation duct 100 to be described below are the same as those of the washing and drying machine 1 according to an embodiment of the disclosure described above, and thus duplicate descriptions will be omitted.

Figure 12:
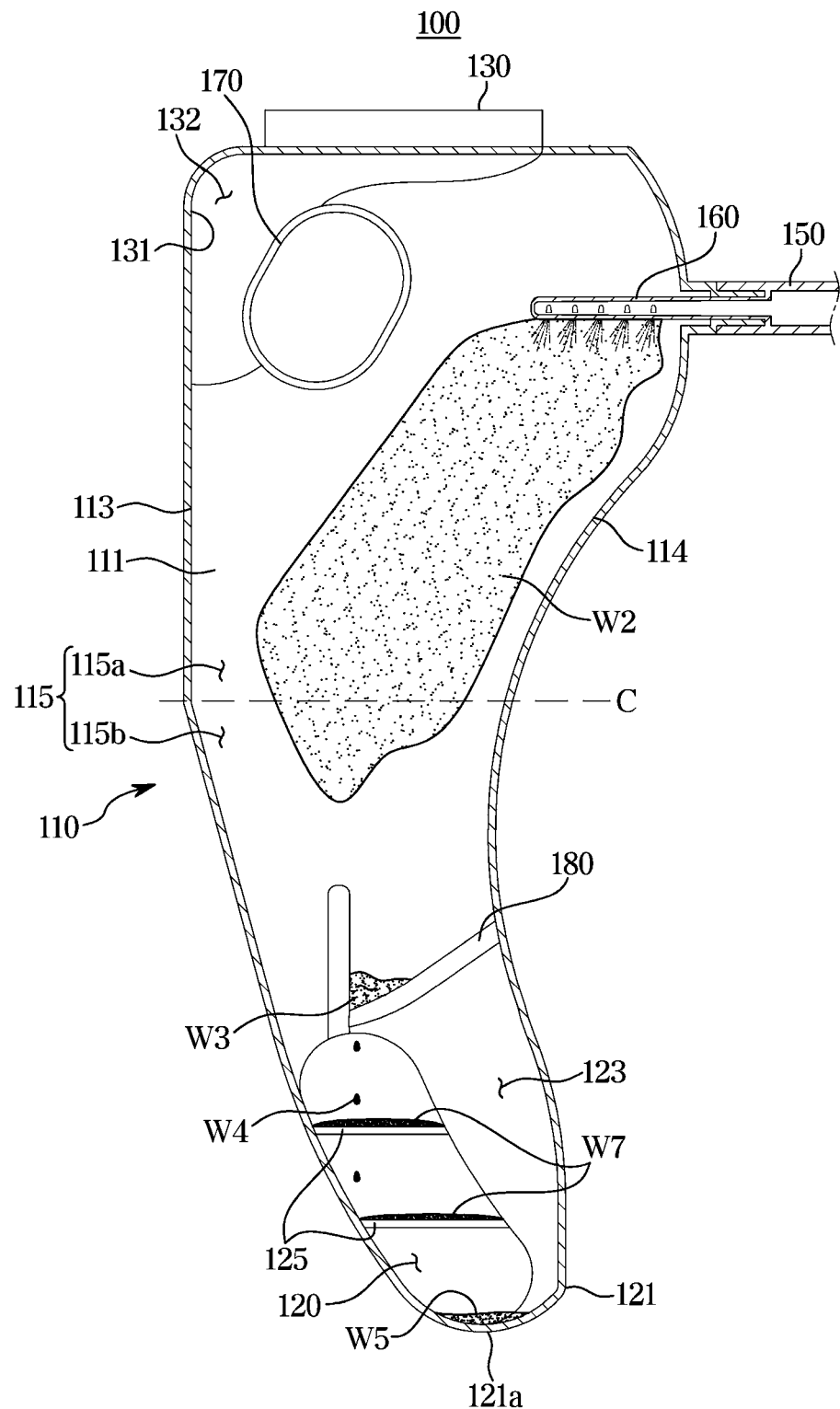
FIG. 12 is a cross-sectional view of a condensation duct of a washing and drying machine according to a second embodiment of the disclosure.
Figure 13:
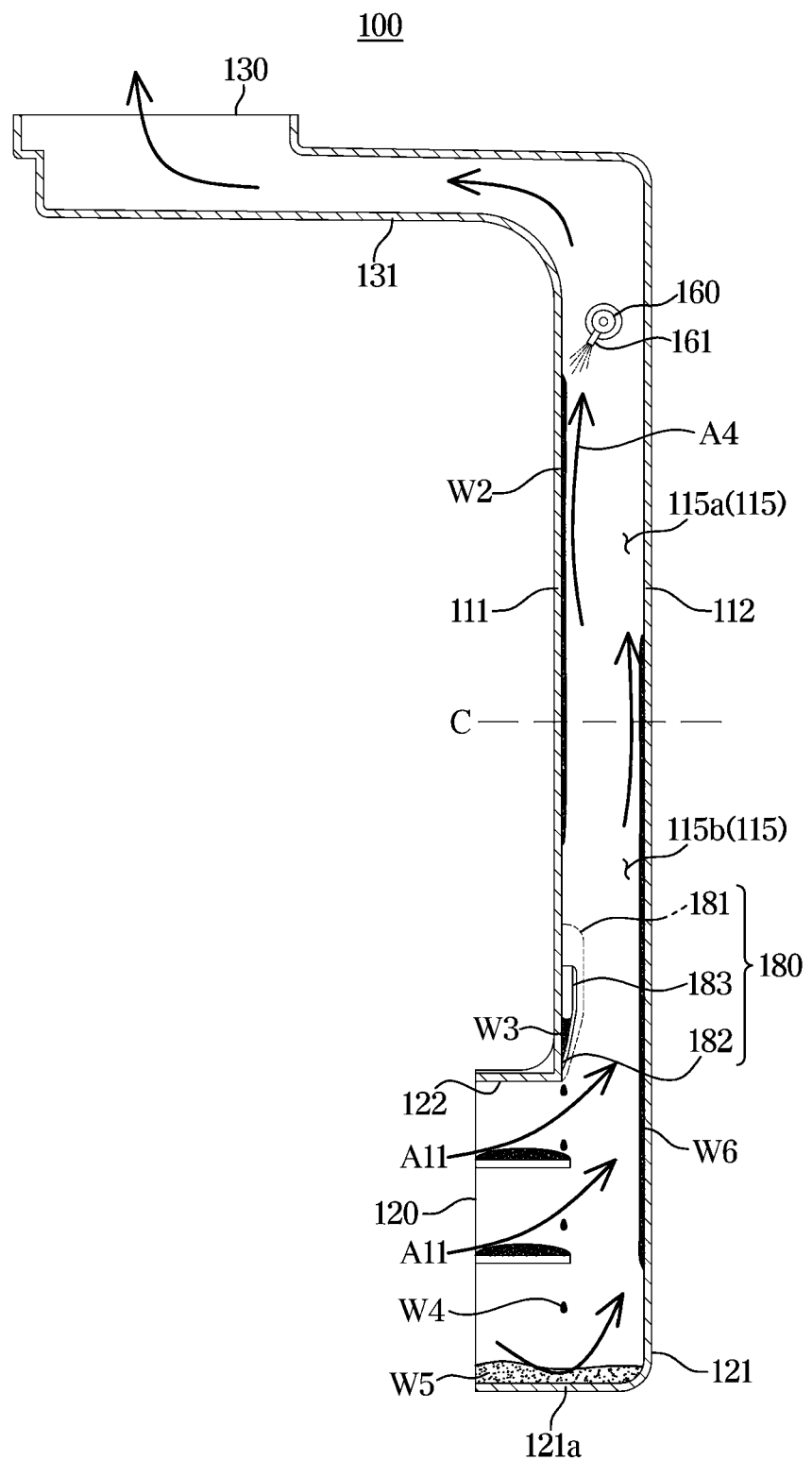
FIG. 13 is a side cross-sectional view of the condensation duct of the washing and drying machine according to the second embodiment of the disclosure.
Figure 14:
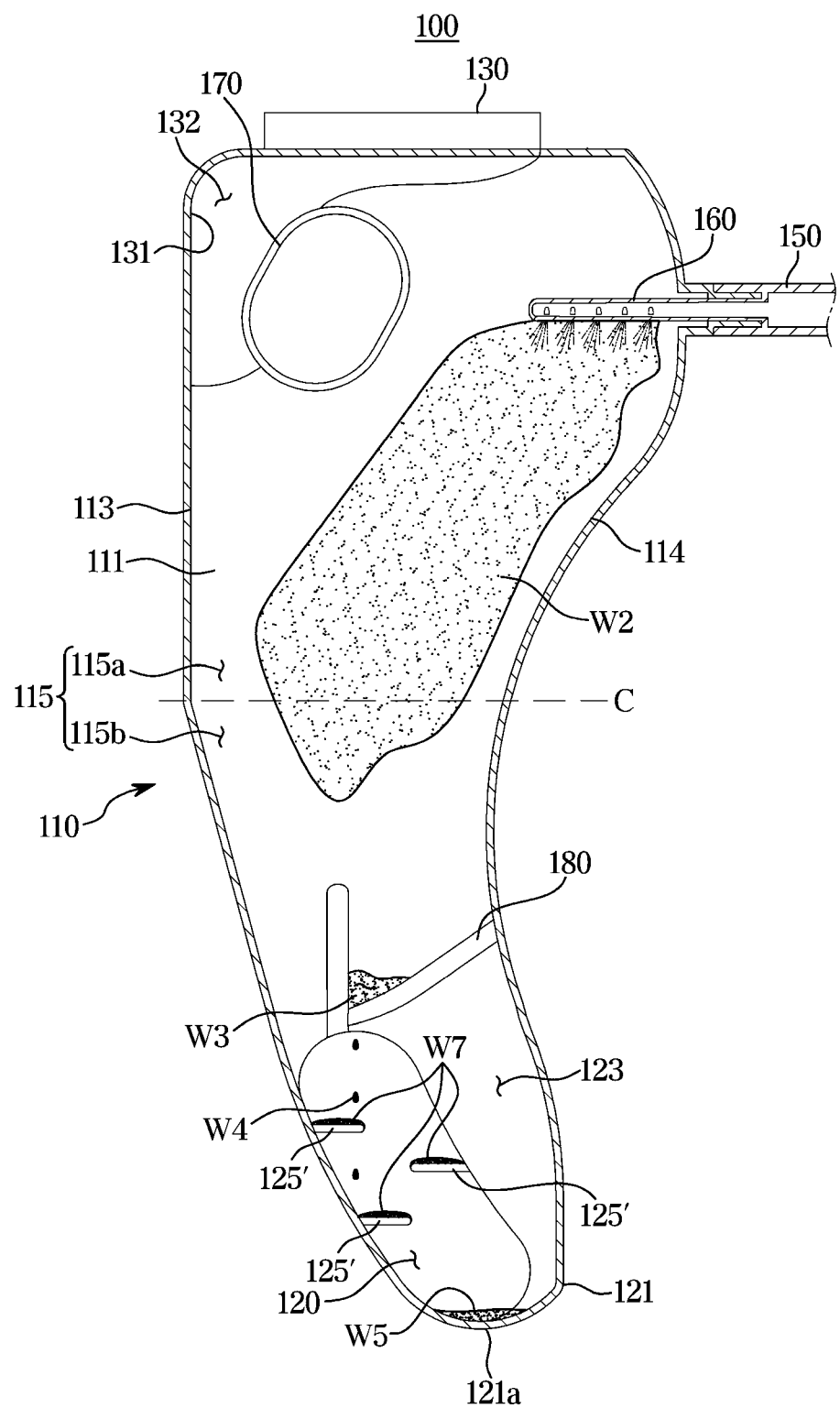
FIG. 14 is a cross-sectional view of a condensation duct of a washing and drying machine according to a third embodiment of the disclosure.

FIG. 12 is a cross-sectional view of a condensation duct of a washing and drying machine according to a second embodiment of the disclosure, FIG. 13 is a side cross-sectional view of the condensation duct of the washing and drying machine according to the second embodiment of the disclosure, and FIG. 14 is a cross-sectional view of a condensation duct of a washing and drying machine according to a third embodiment of the disclosure.

As illustrated in FIGS. 12 and 13, the condensation duct 100 according to the second embodiment of the disclosure may include an auxiliary collecting portion 125 disposed in the inlet 120.

The auxiliary collecting portion 125 may be provided in a rib shape extending in the left-right direction from the inside of the inlet 120. A plurality of the auxiliary collecting portions 125 may be provided, but the disclosure is not limited thereto, and one of the auxiliary collecting portion 125 may be provided.

The auxiliary collecting portion 125 may be disposed at the fourth position W4. Accordingly, a part of the condensation water W falling from the fourth position W4 may be collected in the auxiliary collecting portion 125.

A position where the condensation water W may be placed in the auxiliary collecting portion 125 may be defined as a seventh position W7.

A predetermined part of the condensation water W may temporarily stay in the auxiliary collecting portion 125, and when the condensation water W in the fourth position W4 is continuously introduced into the auxiliary collecting portion 125, the condensation water W in the auxiliary collecting portion 125 may fall to the collecting portion 121 again.

The auxiliary collecting portion 125 may extend from the inlet 120 to the fourth position W4 in the front-rear direction.

In order to not restrict the flow of air in the condensation flow path 115, a thickness of the auxiliary collecting portion 125 in the up-down direction may be less than or equal to a predetermined length.

The condensation water W may temporarily stay in the seventh position W7 by the auxiliary collecting portion 125, and air A11 introduced through the inlet 120 may collide with the condensation water W placed in the seventh position W7, so that the condensation efficiency of the condensation duct 100 may be improved.

Compared to the air passing through the inlet 120 of the condensation duct 100 according to an embodiment of the disclosure, the air A11 colliding with the condensation water W placed in the seventh position W7 additionally passes through the inlet 120 of the condensation duct 100 together with the air directly passing through the inlet 120 of the condensation duct 100, so that more moisture in air may be condensed by the condensation water W or the amount of the condensation water W carried to the second surface 112 may increase.

As illustrated in FIG. 14, an auxiliary collecting portion 125' according to the third embodiment of the disclosure may be configured such that only a portion thereof extends from the inside of the outlet 120 in the left-right direction.

The auxiliary collecting portion 125 illustrated in FIG. 12 extends in the left-right direction to be connected to the left and right sides inside the outlet 120, but the auxiliary collecting portion 125' illustrated in FIG. 14 may extend from the left or right inside the outlet 120 so as not to be in contact with the opposite side.

Accordingly, unlike the auxiliary collecting portion 125 illustrated in FIG. 12, the auxiliary collecting portion 125' illustrated in FIG. 14 may minimize the suppression of the flow of air passing through the inlet 120.

Hereinafter, the condensation duct 100 of the washing and drying machine 1 according to a fourth embodiment of the disclosure will be described. Configurations other than the condensation duct 100 to be described below are the same as those of the washing and drying machine 1 according to an embodiment of the disclosure described above, and thus duplicate descriptions will be omitted.

Figure 15:
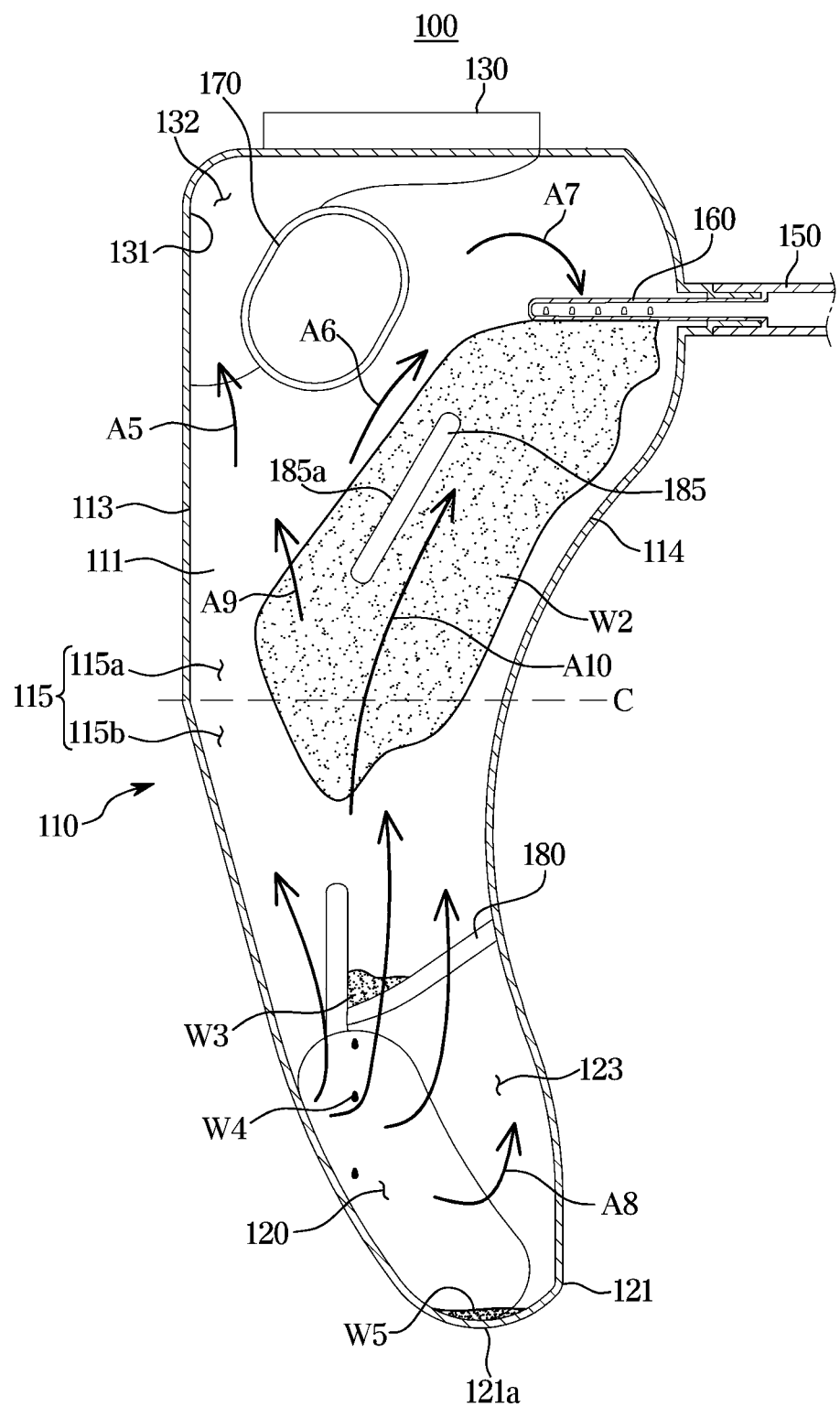
FIG. 15 is a cross-sectional view of a condensation duct of a washing and drying machine according to a fourth embodiment of the disclosure.

FIG. 15 is a cross-sectional view of a condensation duct of a washing and drying machine according to a fourth embodiment of the disclosure.

As illustrated in FIG. 15, the condensation duct 100 may include an auxiliary rib 185. The auxiliary rib 185 may be disposed in the first region 115a. However, the disclosure is not limited thereto, and the auxiliary rib 185 may be disposed in the second region 115b, and a plurality of the auxiliary rib 185 may be provided.

The auxiliary rib 185 may be disposed to be spaced apart from the rib 180. The auxiliary rib 185 may be disposed at the second position W2.

The auxiliary rib 185 may guide the direction of a rising airflow. In detail, the auxiliary rib 185 may be configured such that a part of the rising air flows to the second side surface 114.

Accordingly, the first rib 181 and the auxiliary rib 185 may adjust the direction of the rising airflow such that at least a part of the rising airflow directs to the second side surface 114.

The auxiliary rib 185 may be disposed to be inclined toward the second side surface 114 with respect to a vertical direction. Accordingly, the auxiliary rib 185 may guide a part air A10 in the inclined direction.

There may be a part air A9 that does not collide with the auxiliary rib 185 in the rising airflow. The part air A9 may further rise and then the direction of the airflow thereof may be changed by the blocking portion 170.

As described above, the auxiliary rib 185 may be disposed at the second position W2. Accordingly, an edge 185a of the auxiliary rib 185 may be in contact with the condensation water W, and a predetermined amount of the condensation water W may be condensed to the auxiliary rib 185 by the surface tension.

Accordingly, the part air A9 flowing along the auxiliary rib 185 may additionally come into contact with the condensation water W.

Hereinafter, the condensation duct 100 of the washing and drying machine 1 according to a fifth embodiment of the disclosure will be described. Configurations other than the condensation duct 100 to be described below are the same as those of the washing and drying machine 1 according to an embodiment of the disclosure described above, and thus duplicate descriptions will be omitted.

Figure 16:
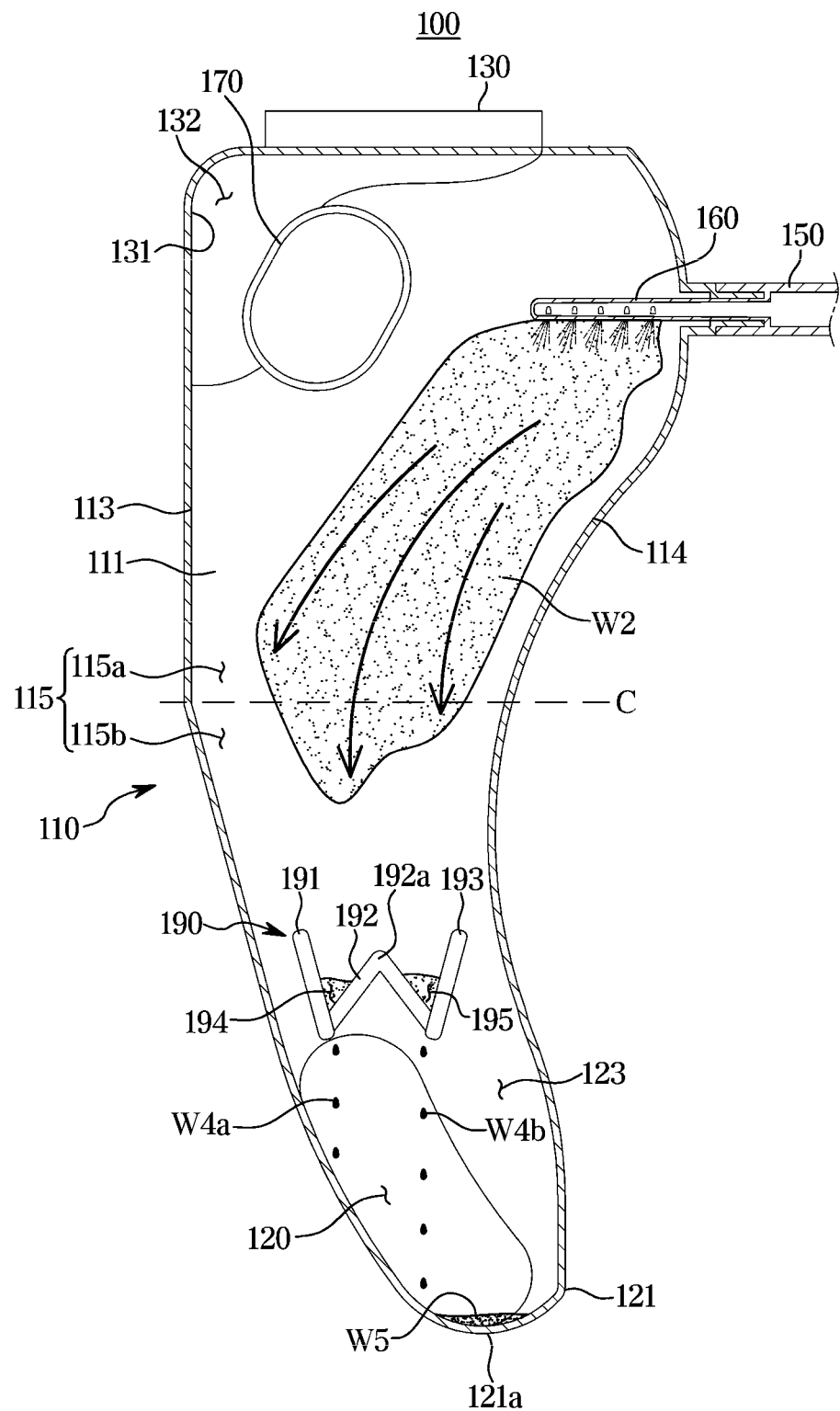
FIG. 16 is a cross-sectional view of a condensation duct of a washing and drying machine according to a fifth embodiment of the disclosure.
Figure 17:
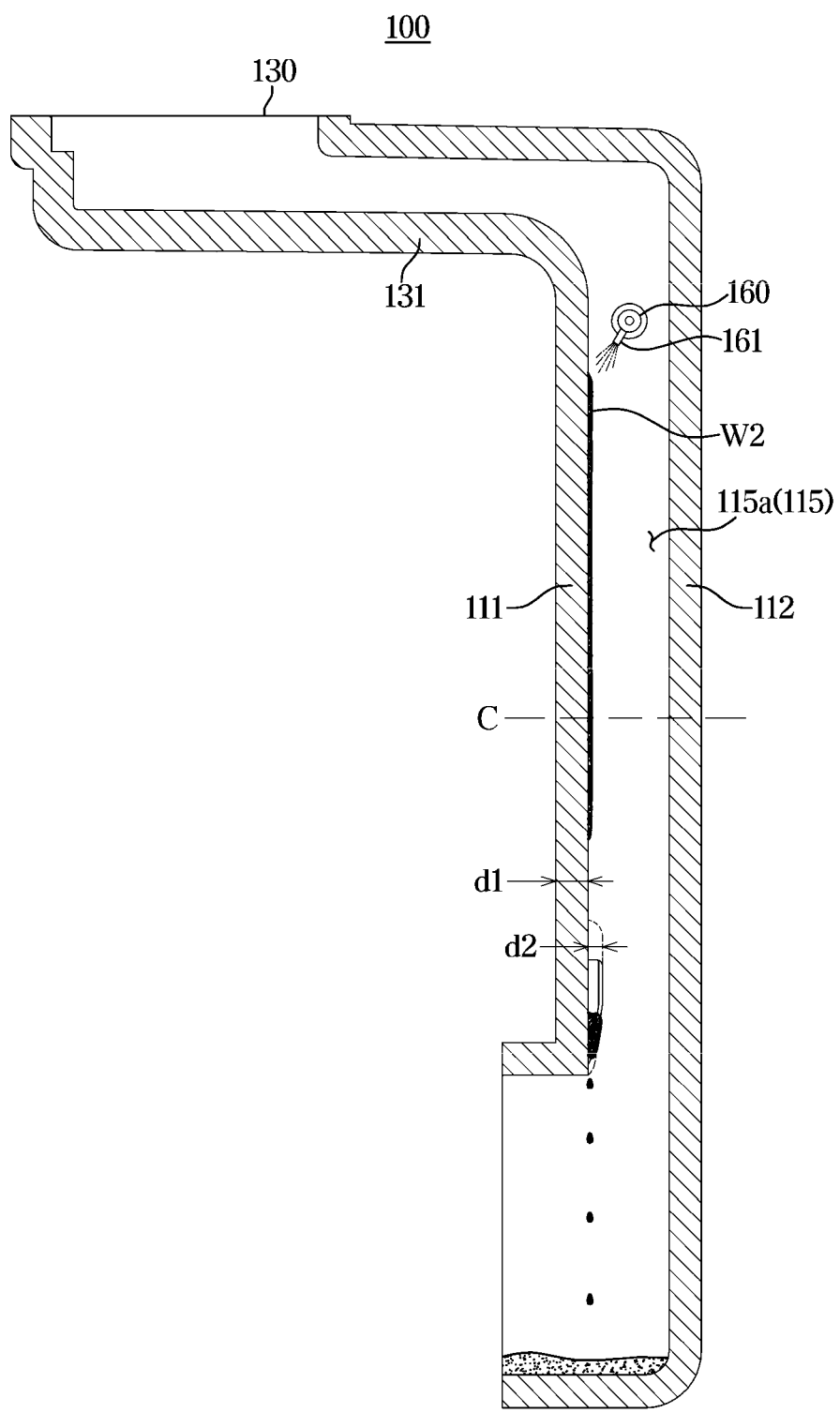
FIG. 17 is a side cross-sectional view of the condensation duct of the washing and drying machine according to the fifth embodiment of the disclosure.

FIG. 16 is a cross-sectional view of a condensation duct of a washing and drying machine according to a fifth embodiment of the disclosure, and FIG. 17 is a side cross-sectional view of the condensation duct of the washing and drying machine according to the fifth embodiment of the disclosure.

As illustrated in FIG. 16, the condensation duct 100 according to the fifth embodiment may include a rib 190 disposed in the second region 115b. The rib 190 may be disposed above the inlet 120.

The rib 190 may include a first rib 191 extending substantially in the up-down direction and disposed to be inclined toward the first side surface 113, and a second rib 192 extending to be inclined from a lower end of the first rib 191 substantially toward the second side surface 114 with respect to the up-down direction.

The second rib 192 may include a bent portion 192a. As described above, the second rib 192 may extend to be inclined from the lower end of the first rib 191 to the bent portion 192a substantially toward the second side surface 114 with respect to the up-down direction. The second rib 192 may extend downward as the extending direction thereof is changed at the bent portion 192a to be inclined toward the second side surface 114.

The rib 190 may include a third rib 193 extending to be inclined from a lower end of the second rib 192 substantially toward the second side surface 114 with respect to the up-down direction.

The rib 190 may include a first gathering portion 194 and a second gathering portion 195 formed by the bent portion 192a of the second rib 192.

In detail, the first gathering portion 194 may be formed between the first rib 191 and the second rib 192. The first gathering portion 194 may be defined as a space formed by connecting the lower end of the first rib 191 and one lower end of the second rib 192.

The second gathering portion 195 may be formed between the second rib 192 and the third rib 193. The second gathering portion 195 may be defined as a space formed by connecting a lower end of the third rib 193 and the other lower end of the second rib 192.

The condensation water W placed in the second position W2 may continue to fall by its own weight, and parts thereof may fall into the first gathering portion 194 and the second gathering portion 195, respectively, so that the condensation water W may be collected in the first gathering portion 194 and the second gathering portion 195.

That is, when positions where the condensation water W is collected in the first gathering portion 194 and the second gathering portion 195 are defined as third positions W3a and W3b, a plurality of the third positions W3a and W3b may be provided.

When positions where the condensation water W falls from the third positions W3a and W3b are defined as fourth positions W4*a* and W4*b*, a plurality of the fourth positions W4*a* and W4*b* may be provided.

As the plurality of fourth positions W4*a* and W4*b* is provided, the amount of condensation water W that may collide with air introduced through the inlet 120 increases, and thus the amount of condensation water W flowing to the second surface 112 increases, so that the condensation efficiency of the condensation duct 100 may finally increase.

As illustrated in FIG. 17, when a thickness of the housing 110 of the condensation duct 100 is defined as d1 and a length of the rib 190 in the front-rear direction is defined as d2, the length d2 of the rib 190 in the front-rear direction may be within about 30% of the thickness d1 of the housing 110.

This is to prevent the rib from interfering with the flow of air on the condensation flow path 115 as the rib 190 extends in the left-right direction. The length d2 of the rib 190 in the front-rear direction as described above may be applied not only to the present embodiment, but also to the rib 180 according to an embodiment of the disclosure or to a rib 190' according to a sixth embodiment, which will be described later.

As the rib 190 is provided to protrude toward the second surface 112 with a predetermined length, a cross-sectional area of the condensation flow path 115 is partially reduced, and thus a flow speed of air may increase.

Accordingly, as the flow speed of air increases in a region where a large amount of the condensation water W is placed by the rib 190, the condensation efficiency of the condensation duct 100 may increase.

Hereinafter, the condensation duct 100 of the washing and drying machine 1 according to a sixth embodiment of the disclosure will be described. Configurations other than the condensation duct 100 to be described below are the same as those of the washing and drying machine 1 according to an embodiment of the disclosure described above, and thus duplicate descriptions will be omitted.

Figure 18:
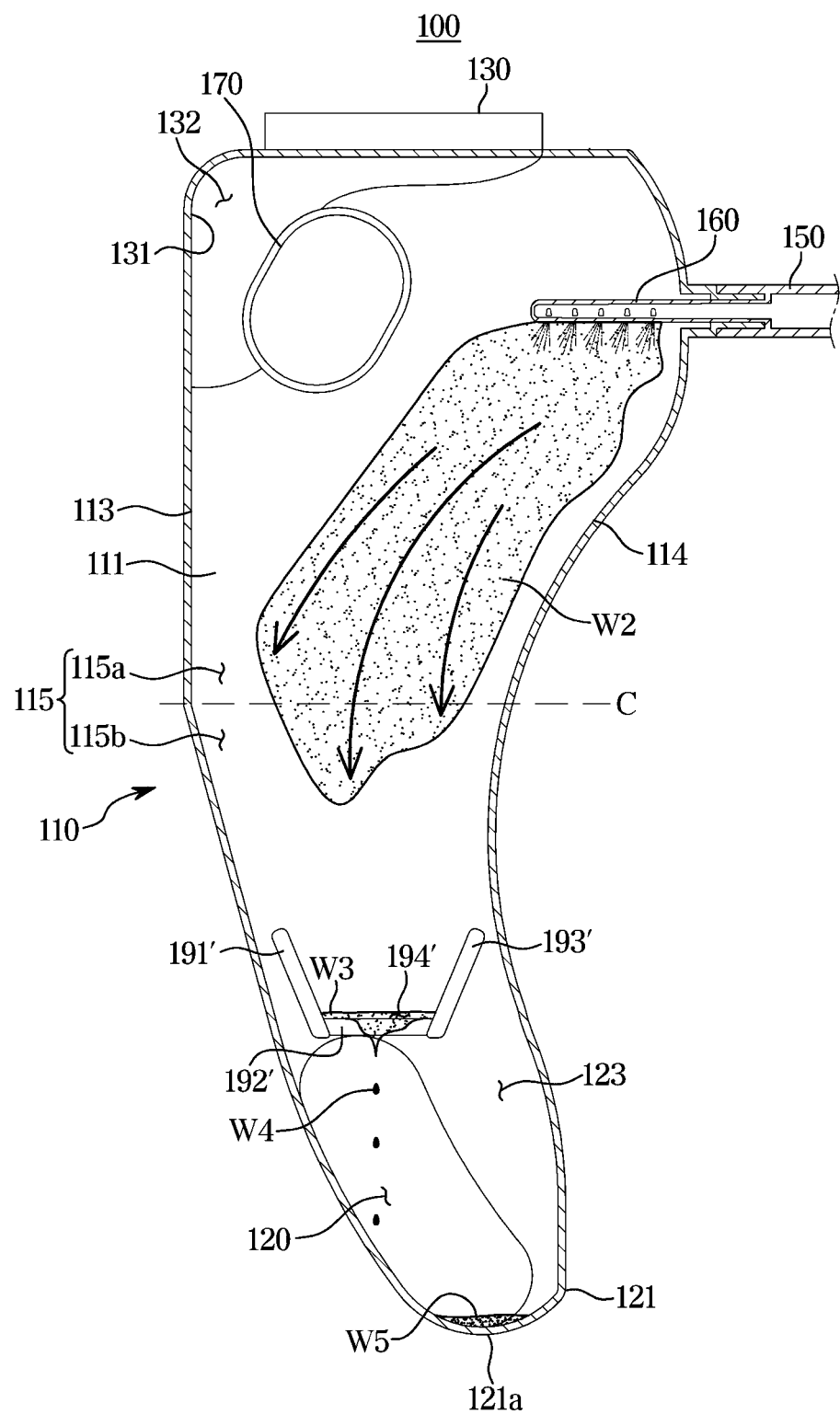
FIG. 18 is a cross-sectional view of a condensation duct of a washing and drying machine according to a sixth embodiment of the disclosure.

FIG. 18 is a cross-sectional view of a condensation duct of a washing and drying machine according to a sixth embodiment of the disclosure.

As illustrated in FIG. 18, the condensation duct 100 according to the sixth embodiment may include a rib 190' disposed in the second region 115*b*. The rib 190' may be disposed above the inlet 120.

The rib 190' may include a first rib 191' extending substantially in the up-down direction and disposed to be inclined toward the first side surface 113, and a second rib 192' extending from a lower end of the first rib 191' in the left-right direction.

One end of the second rib 192' may be disposed in contact with the lower end of the first rib 191', and the other end of the second rib 192' may extend horizontally from the lower end of the first rib 191' in the direction of the second side surface 114.

The rib 190' may include a third rib 193' extending to be inclined substantially toward the second side surface 114 with respect to the up-down direction from the other end of the second rib 192'.

The rib 190' may include a gathering portion 194' formed between the first rib 191', the second rib 192', and the third rib 193'.

The gathering portion 194' may be defined as a space formed between the lower end of the first rib 191', an upper end of the second rib 192', and a lower end of the third rib 193'.

The condensation water W placed in the second position W2 may continue to fall by its own weight, and a part thereof may fall to the gathering portion 194' to be collected in the gathering portion 194'.

The gathering portion 194' is formed in the entire region of the upper end of the second rib 192' extending horizontally and may be provided to have a large area compared to the gathering portion 182 according to an embodiment of the disclosure.

Accordingly, an area of a third position W3' formed in the gathering portion 194' may increase. Therefore, the amount of the condensation water W collected in the third position W3', which may collide with the air flowing on the third position W3', may increase.

When a position where the condensation water W falls from a third position w3' is defined as the fourth position W4, as the amount of condensation water W temporarily placed in the fourth position W4 increases, the amount of condensation water W that may collide with air introduced through the inlet 120 may increase, and thus the amount of condensation water W flowing to the second surface 112 may increase to finally increase the condensation efficiency of the condensation duct 100.

Although not shown in the drawing, the first rib 191' and the third rib 193' may extend in a direction perpendicular to the second rib 192'.

The first rib 191' and the third rib 193' illustrated in FIG. 18 may extend upward from opposite ends of the second rib 192', respectively, to be inclined at a predetermined angle.

However, the disclosure is not limited thereto, and the first rib 191' and the third rib 193' may extend vertically from the opposite ends of the second rib 192' in the up-down direction, respectively. In this case, the second rib 192' may likewise extend in the horizontal direction.

Hereinafter, the condensation duct 100 of the washing and drying machine 1 according to a seventh embodiment of the disclosure will be described. Configurations other than the condensation duct 100 to be described below are the same as those of the washing and drying machine 1 according to an embodiment of the disclosure described above, and thus duplicate descriptions will be omitted.

Figure 19:
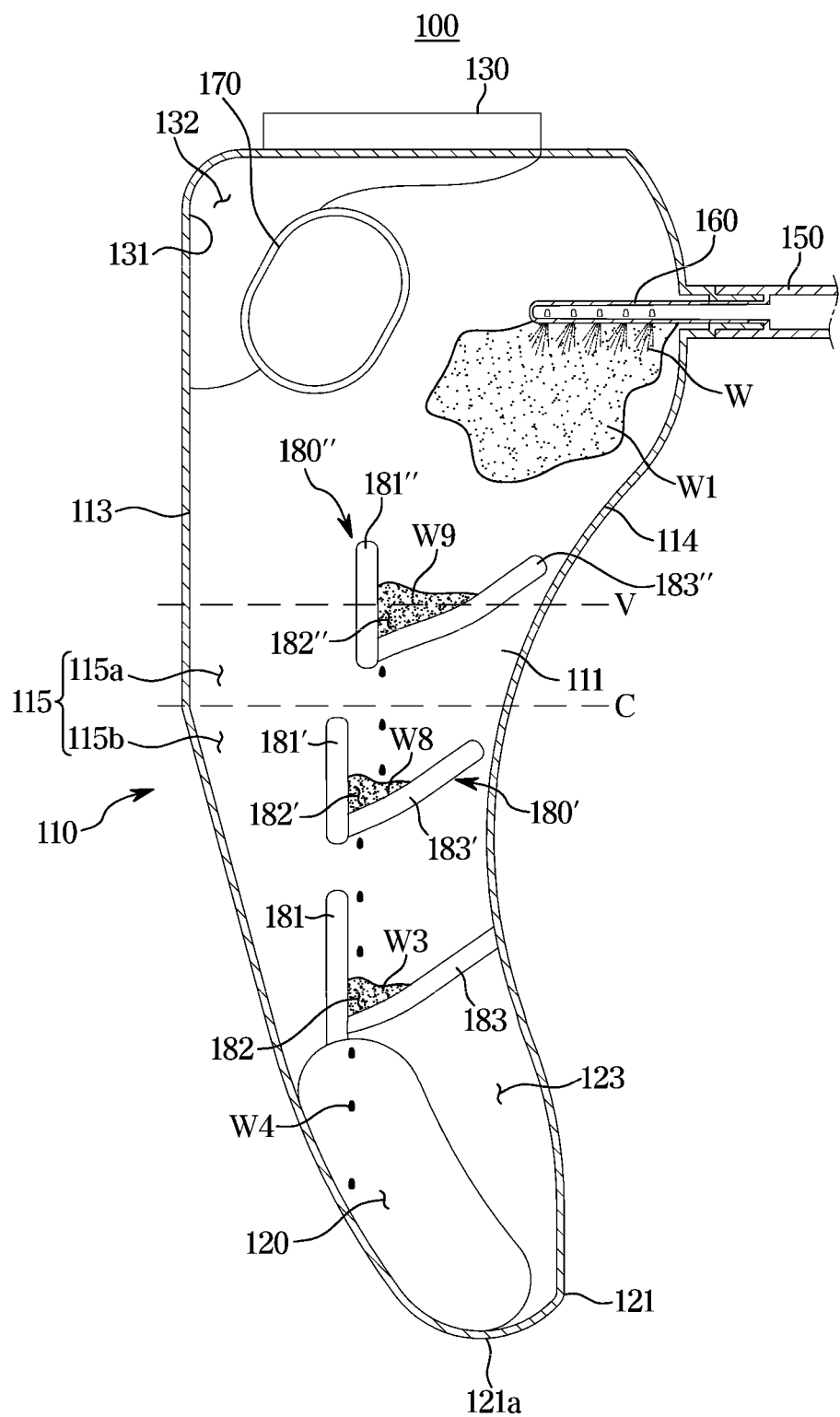
FIG. 19 is a cross-sectional view of a condensation duct of a washing and drying machine according to a seventh embodiment of the disclosure.

FIG. 19 is a cross-sectional view of a condensation duct of a washing and drying machine according to a seventh embodiment of the disclosure.

As illustrated in FIG. 19, the condensation duct 100 may include the rib 180 disposed in the second region 115*b*. The rib 180 may be disposed above the inlet 120.

The rib 180 may include the first rib 181 extending substantially in the up-down direction and the second rib 183 extending to be inclined substantially with respect to the up-down direction from the lower end of the first rib 181.

In detail, the first rib 181 may be provided to extend upward from the upper end of the inlet 120. It may be appropriate that the first rib 181 extends upward from the central portion of the upper end of the inlet 120.

The rib 180 may protrude from the first surface 111 toward the second surface 112. In order to reduce the resistance of air introduced into the condensation duct 100, the rib 180 may extend only to a predetermined length toward the second surface 112.

The rib 180 may include a gathering portion 182 formed between the first rib 181 and the second rib 183.

The gathering portion 182 may be defined as a space formed by connecting the lower end of the first rib 181 and the lower end of the second rib 183. The condensation duct 100 may include additional ribs 180' and 180" disposed between the rib 180 and the supply nozzle 160.

That is, the condensation duct 100 may include a plurality of the ribs 180, 180', and 180". For convenience of description, an essential rib is defined as the rib 180, and additional ribs are defined as the first additional rib 180' and the second additional rib 180".

The first additional rib 180' and the second additional rib 180" may be disposed between the rib 180 and the supply nozzle 160.

The first additional rib 180' may include a third rib 181' extending substantially in the up-down direction and a fourth rib 183' extending to be inclined substantially with respect to the up-down direction from a lower end of the third rib 181'.

The first additional rib 180' may include a second gathering portion 182' formed between the third rib 181' and the fourth rib 183'.

The second gathering portion 182' may be defined as a space formed by connecting the lower end of the third rib 181' and a lower end of the fourth rib 183'.

The second additional rib 180" may include a fifth rib 181" extending substantially in the up-down direction and a sixth rib 183" extending to be inclined substantially with respect to the up-down direction from a lower end of the fifth rib 181".

The second additional rib 180" may include a third gathering portion 182" formed between the fifth rib 181" and the sixth rib 183".

The third gathering portion 182" may be defined as a space formed by connecting the lower end of the fifth rib 181" and a lower end of the sixth rib 183".

The condensation water W placed in the first position W1 may continue to fall by its own weight, and a part thereof may fall to the third gathering portion 182" of the second additional rib 180" to be collected in the third gathering portion 182".

A position where the condensation water W is collected in the third gathering portion 182" may be defined as a ninth position W9. The condensation water W may temporarily stay in the third gathering portion 182". Thereafter, the condensation water W may continuously flow from the first position W1 to the ninth position W9.

The condensation water W temporarily collected in the ninth position W9 may be fallen from the third gathering portion 182" by the continuously introduced condensation water W and collected in the second gathering portion 181'.

A position where the condensation water W is collected in the second gathering portion 182' may be defined as an eighth position W8. The condensation water W may be temporarily collected in the second gathering portion 182'. Thereafter, the amount of condensation water W collected in the eighth position W8 may be increased by the condensation water W falling from the ninth position W9 and continuously introduced into the eighth position W8.

The condensation water W temporarily collected in the eighth position W8 may be collected in the gathering portion 182 by falling from the second gathering portion 182' by the continuously introduced condensation water W.

As three of the gathering portions 182, 182', and 182" are formed on the first surface 111, the probability that air flowing along the first surface 111 and the condensation water W collide increases, so that the condensation efficiency of the condensation duct 100 may increase.

The third rib 181' and the fifth rib 181" may guide the flow direction of air flowing upward together with the first rib 181.

As described above, the air introduced into the condensation duct 100 through the inlet 120 flows in the direction of the first side surface 113, and the third rib 181' and the fifth rib 181" may extend substantially in the up-down direction to guide air flowing in the direction of the first side surface 113 to flow upward.

The third gathering portion 182" of the second additional rib 180" may be provided to be disposed below a height V of about ⅔ of the total height from a lower end of the condensation duct 100 in the up-down direction.

This is because the condensation water W placed in the third gathering portion 182" may directly flow out of the outlet 130 without colliding with air flowing in the condensation duct 100 when the third gathering portion 182" is disposed at a height higher than the height V of about ⅔ of the total height of the condensation duct 100.

Therefore, the second additional ribs 180" is disposed below a predetermined height to increase the condensation efficiency of the condensation duct 100.

Hereinafter, the condensation duct 100 of the washing and drying machine 1 according to an eighth embodiment of the disclosure will be described. Configurations other than the condensation duct 100 to be described below are the same as those of the washing and drying machine 1 according to an embodiment of the disclosure described above, and thus duplicate descriptions will be omitted.

Figure 20:
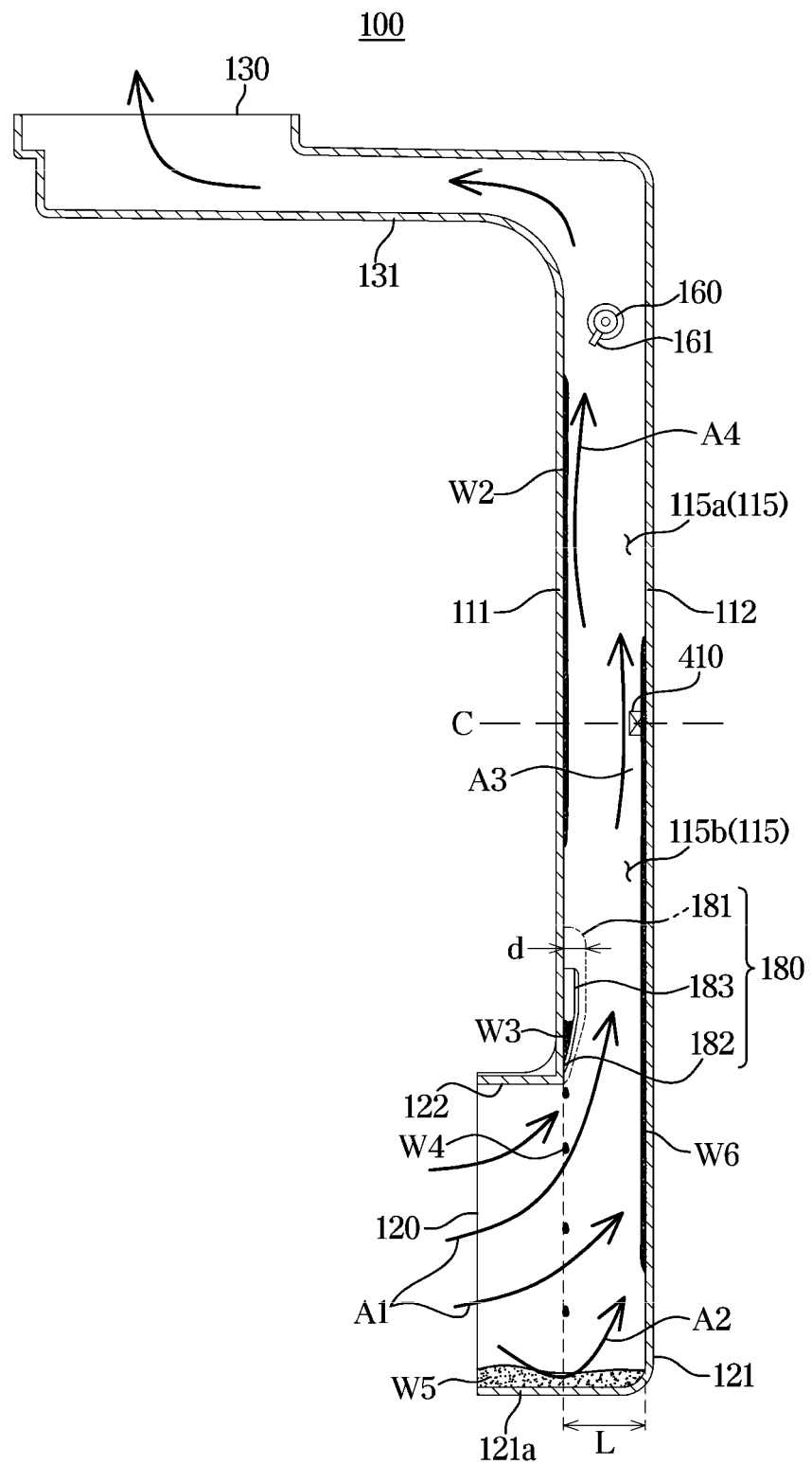
FIG. 20 is a side cross-sectional view of a condensation duct of a washing and drying machine according to an eighth embodiment of the disclosure.
Figure 21:
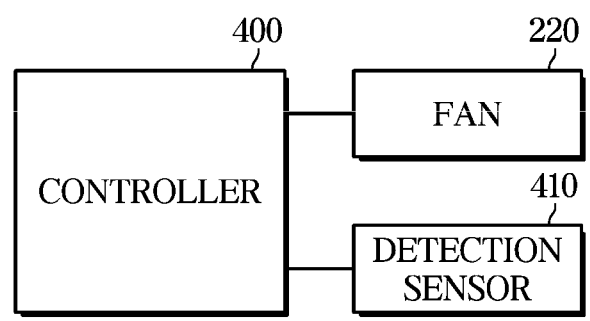
FIG. 21 is a schematic block diagram of control of the washing and drying machine according to the eighth embodiment of the disclosure.

FIG. 20 is a side cross-sectional view of a condensation duct of a washing and drying machine according to an eighth embodiment of the disclosure, and FIG. 21 is a schematic block diagram of control of the washing and drying machine according to the eighth embodiment of the disclosure.

As illustrated in FIGS. 20 and 21, the condensation duct 100 may include a detection sensor 410 disposed inside the condensation duct 100.

The washing and drying machine 1 may include a controller 400 electrically connected to the detection sensor 410 and the fan 220.

The detection sensor 410 may be provided as a wind speed sensor for detecting the speed of air flowing in the condensation flow path 115.

The detection sensor 410 may transmit a value for the speed of air detected inside the condensation flow path 115 to the controller 400.

The controller 400 may control the fan 220 to increase the output of the fan 220 when a wind speed value received from the detection sensor 410 is less than a pre-stored wind speed value.

When the flow of air in the condensation duct 100 is lowered, the controller 400 may control a RPM of the fan 220 through the detection value transmitted from the detection sensor 410.

Therefore, the speed of air in the condensation duct 100 may be kept constant through the controller 400, so that the condensation performance of the condensation duct 100 may be kept constant. In addition, when the flow of air is lowered, the output of the fan 220 may be increased to increase the speed of air, thereby improving the condensation efficiency of the condensation duct 100.

It may be appropriate that the detection sensor 410 is disposed on the center line C of the condensation duct 100 in the up-down direction.

The detection sensor 410 is not limited thereto, and may be provided as a temperature detection sensor capable of detecting the temperature around the detection sensor 410.

The detection sensor 410 may be disposed on the second surface 112 and may be located on the center line C of the condensation duct 100 as described above.

The condensation water W flowing with air from the fourth position W4 may remain on the center line C of the condensation duct 100 on the second surface 112.

Accordingly, the condensation water W remains around the detection sensor 410, and by the remaining condensation water W, the temperature around the detection sensor 410 may be detected lower than the temperature when the condensation water W does not exist around the detection sensor 410.

The controller 400 may store a temperature value detected by the detection sensor 410 as a reference temperature value when the condensation water W remains around the detection sensor 410. When a temperature value higher than the reference temperature value is transmitted from the detection sensor 410 to the controller 400, the controller 400 may control the fan 220 to increase the output of the fan 220.

A case where a temperature value higher than the reference temperature value is detected from the detection sensor 410 occurs because there is no the condensation water W around the detection sensor 410, and this is because the flow of air in the condensation flow path 115 is lowered so that the air does not sufficiently move the condensation water located in the fourth position W4 to the second surface 112.

That is, the condensation water W does not remain around the detection sensor 410 because air does not move the condensation water W to the center line C, and thus the value detected by the detection sensor 410 is greater than the reference temperature value.

When the output of the fan 220 is increased by the controller 400, the speed of air flowing in the condensation flow path 115 increases, and thus the condensation water W temporarily collected in the fourth position W4 may reach the center line C on the second surface 112 or up to an upper side than the center line C by the air.

Accordingly, the amount of the condensation water W distributed on the second surface 112 increases, and the probability that air flowing along the second surface 112 and the condensation water W may collide increases, so that the condensation efficiency may increase.

That is, the controller 400 may control the output of the fan 220 according to the temperature value detected by the detection sensor 410 to maintain the performance of the condensation duct 100 constant.

Hereinafter, the condensation duct 100 of the washing and drying machine 1 according to a ninth embodiment of the disclosure will be described. Configurations other than the condensation duct 100 to be described below are the same as those of the washing and drying machine 1 according to an embodiment of the disclosure described above, and thus duplicate descriptions will be omitted.

Figure 22:
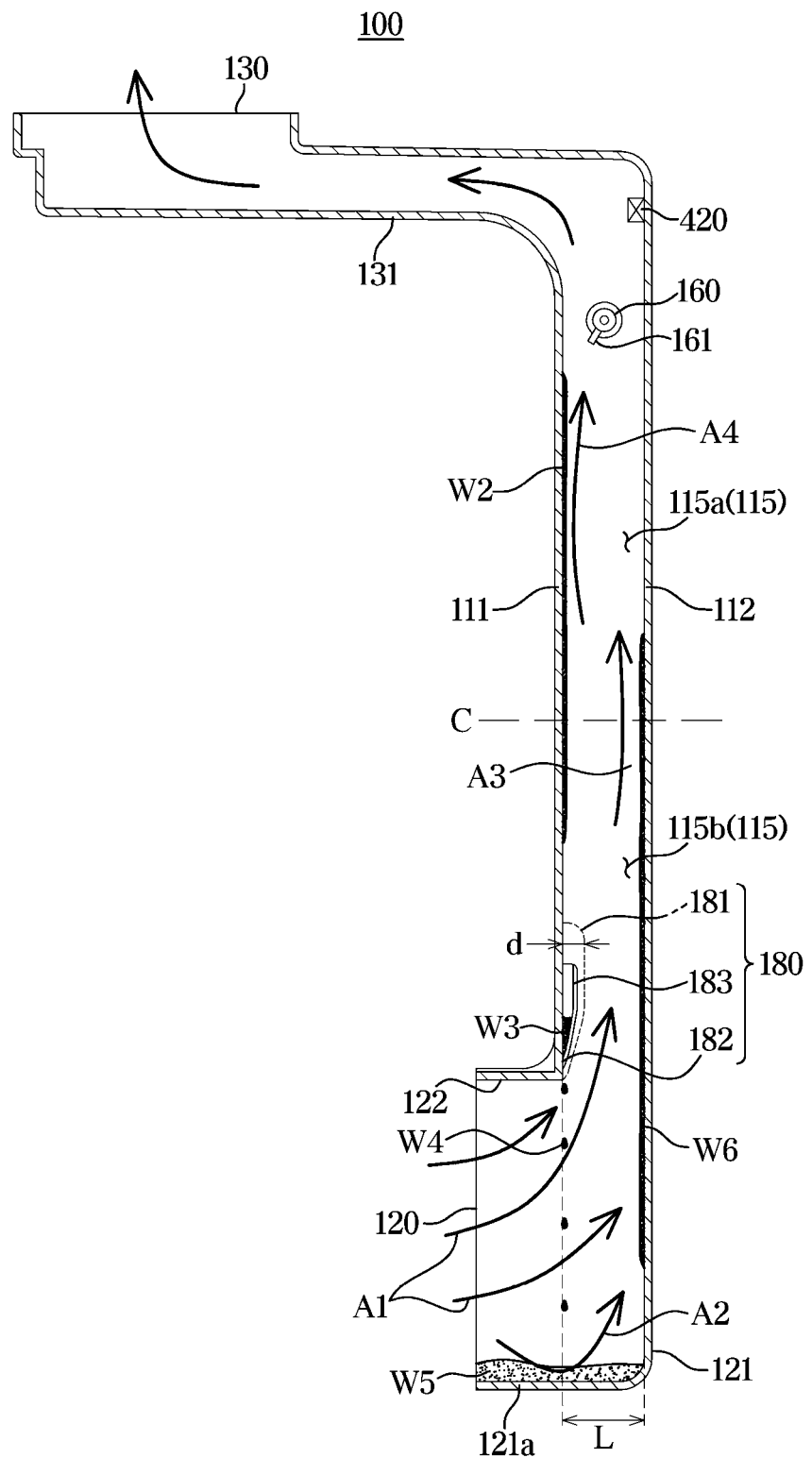
FIG. 22 is a side cross-sectional view of a condensation duct of a washing and drying machine according to a ninth embodiment of the disclosure.

FIG. 22 is a side cross-sectional view of a condensation duct of a washing and drying machine according to a ninth embodiment of the disclosure.

As illustrated in FIG. 22, the condensation duct 100 may include a detection sensor 420 disposed inside the condensation duct 100.

The detection sensor 420 may be disposed on the first region 115a.

The detection sensor 420 may be provided as a dry detection sensor for detecting a dryness degree around the detection sensor 420.

The controller 400 may store the dryness degree value detected by the detection sensor 420 as a reference dryness degree value when the condensation duct 100 is generally condensed in a normal range. When a dryness degree value higher than the reference dryness degree value is transmitted from the detection sensor 420 to the controller 400, the controller 400 may control the fan 400 to increase the output of the fan 220.

A case in which a dryness degree value higher than the reference dryness degree value is detected from the detection sensor 420 occurs because a small amount of the condensation water W is distributed in the first region 115a, and this is because the flow of air in the condensation flow path 115 is lowered so that the air does not sufficiently move the condensation water located in the fourth position W4 to the first region 115a.

That is, because air may not move the condensation water W to the first region 115a, the dryness degree in the air in the first region 115a may be detected high.

When the output of the fan 220 increases by the controller 400, the speed of air flowing in the condensation flow path 115 increases, and thus the condensation water W temporarily collected in the fourth position W4 may be delivered to the first region 115a by the air.

Accordingly, the amount of the condensation water W distributed in the first region 115a increases, and the probability that air flowing along the first region 115a and the condensation water W may collide increases, so that the condensation efficiency may increase.

That is, the controller 400 may control the output of the fan 220 according to the dryness degree value detected by the detection sensor 420 to maintain the performance of the condensation duct 100 constant.

As is apparent from the above, in a condensation duct according to the disclosure and a washing and drying machine including the same, the condensation duct is configured such that wet air generated in a drum collides with condensation water as much as possible inside the condensation duct having a predetermined size to maximize the condensation efficiency of the condensation duct, thereby improving the drying performance of the washing and drying machine.

In addition, a filter that can be automatically cleaned is disposed between the condensation duct and a drying duct, so that the condensation performance can be further improved while foreign substances contained in air to be dried are removed.

While the disclosure has been particularly described with reference to exemplary embodiments, it should be understood by those of skilled in the art that various changes in form and details may be made without departing from the spirit and scope of the disclosure.

What is claimed is:
1. A washing and drying machine comprising:
 a cabinet;
 a tub disposed inside the cabinet;
 a condensation duct including:
   an inlet connected to the tub to receive air from an inside of the tub,
   a housing connected to the inlet to receive air from the inlet and condense moisture from the air received from the inlet,
   a supply nozzle configured to supply condensation water to an inside of the housing,
   at least one rib disposed inside the housing and adjacent to the inlet, and including a rib gatherer configured to collect at least a portion of the condensation water supplied from the supply nozzle and at least a portion of the condensed moisture, and
   an outlet disposed at an upper portion of the housing; and a drying duct connected to the outlet of the condensation duct to receive air from the outlet of the condensation duct, heat the air received from the outlet, and supply the heated air to the inside of the tub, wherein the inlet is disposed at a lower portion of the housing, and wherein the rib gatherer is configured to release at least a portion of the condensation water and the condensed moisture collected in the rib gatherer toward the inlet.

2. The washing and drying machine according to claim 1, wherein the at least one rib further comprises a first rib extending in a first direction and a second rib extending in a second direction from a lower end of the first rib, and the rib gatherer is formed by and between the first rib and the second rib.

3. The washing and drying machine according to claim 1, wherein the housing comprises a first surface on which the inlet is disposed and a second surface facing the first surface, and the supply nozzle is configured to spray the condensation water toward the first surface.

4. The washing and drying machine according to claim 3, wherein the rib is disposed on the first surface and formed to protrude from the first surface toward the second surface.

5. The washing and drying machine according to claim 4, wherein the housing further comprises an inlet collector disposed at a lower portion of the inlet to collect water released from the rib gatherer.

6. The washing and drying machine according to claim 5, wherein the rib gatherer is configured such that the condensation water collected in the rib gatherer passes through a region corresponding to the inlet in a vertical direction and falls to the inlet collector.

7. The washing and drying machine according to claim 6, wherein the drying duct comprises a fan configured to move the air received from the outlet from the of the condensation duct into the drying duct and thereby move air into the condensation duct from the inside of the tub, and the condensation duct is configured such that water released from the rib gatherer collides with the air passing through the inlet when the air is moved into the condensation duct from the inside of the tub through the inlet by the fan.

8. The washing and drying machine according to claim 1, wherein the housing comprises a first side surface on which the supply nozzle is disposed and a second side surface facing the first side surface, and the outlet is disposed closer to the second side surface than to the first side surface in a horizontal direction.

9. The washing and drying machine according to claim 8, further comprising a blocking portion disposed inside the housing to restrict a flow of the air inside the housing, wherein the blocking portion is disposed closer to the outlet than to the supply nozzle in the horizontal direction.

10. The washing and drying machine according to claim 2, wherein the first rib extends substantially in a vertical direction, and the second rib extends to be inclined substantially at an angle from 0 degrees to 60 degrees with respect to a horizontal direction.

11. The washing and drying machine according to claim 1, further comprising a filter disposed between the drying duct and the outlet of the condensation duct.

12. The washing and drying machine according to claim 11, further comprising a filter cleaning nozzle disposed between the outlet and the filter to spray water into the filter to remove foreign substances collected in the filter.

13. The washing and drying machine according to claim 1, wherein the outlet is provided to be opened in a vertical direction, the drying duct further comprises a fan rotating about a rotating shaft extending in the vertical direction to move air from the condensation duct into the drying duct, and a suction port allowing air moved by the fan to be drawn into the drying duct, and the rotating shaft of the fan and the center of the outlet are arranged so as not to overlap in the vertical direction.

14. The washing and drying machine according to claim 1, wherein the at least one rib includes a first rib, and a second rib disposed between the supply nozzle and the first rib.

15. The washing and drying machine according to claim 5, wherein the condensation duct further comprises an auxiliary inlet collector disposed in the inlet in a vertical direction and configured to temporarily collect water released from the rib gatherer.

16. A washing and drying machine comprising:

a cabinet;

a tub disposed inside the cabinet;

a condensation duct including:

an inlet connected to the tub to receive air from an inside of the tub, a housing having an upper region and a lower region, and connected to the inlet at the lower region to receive air from the inlet and condense moisture from the air received from the inlet, a supply nozzle disposed in the upper region of the housing and configured to supply condensation water to an inside of the housing, a first rib disposed in the lower region of the housing and extending in a first direction, and a second rib extending in a second direction from a lower end of the first rib, and an outlet disposed at an upper portion of the housing; and a drying duct connected to the outlet of the condensation duct to receive air from the outlet of the condensation duct, heat the air received from the outlet, and supply the heated air to the inside of the tub.

17. The washing and drying machine according to claim 16, wherein the first rib and the second rib form a rib gatherer to collect at least a part of the condensation water supplied from the supply nozzle and at least a portion of the condensed moisture, wherein the rib gatherer is configured to release at least a portion of the condensation water and the condensed moisture collected in the rib gatherer toward the inlet.

18. The washing and drying machine according to claim 16, wherein a width of the upper region in a horizontal direction is larger than a width of the lower region.

19. The washing and drying machine according to claim 17, wherein
the housing further comprises a inlet collector disposed at a lower portion of the inlet to collect water released from the rib gatherer, and
a lower end of the inlet collector is formed parallel to a front-rear direction.

20. A washing and drying machine comprising:
an inlet configured to receive air;
a housing extending in a vertical direction and connected to the inlet at a lower portion of the housing to receive air from the inlet;
an outlet disposed at an upper portion of the housing to discharge air from the housing;
a supply nozzle configured to supply condensation water to an inside of the housing;
a first rib disposed inside the housing and adjacent to the inlet, and extending in a first direction;
a second rib extending in a second direction from a lower end of the first rib; and
a rib gatherer formed by and disposed between the first rib and the second rib to collect at least a part of the condensation water supplied from the supply nozzle,
wherein the rib gatherer is configured to release at least a portion of the condensation water collected in the rib gatherer toward the inlet.

* * * * *